(12) United States Patent
Hayata et al.

(10) Patent No.: US 8,179,304 B2
(45) Date of Patent: May 15, 2012

(54) DIRECT-CURRENT BLOCKING CIRCUIT, HYBRID CIRCUIT DEVICE, TRANSMITTER, RECEIVER, TRANSMITTER-RECEIVER, AND RADAR DEVICE

(75) Inventors: Kazuki Hayata, Soraku-gun (JP); Kazumi Nakazuru, Soraku-gun (JP)

(73) Assignee: Kyocera Corporation, Kyoto (JP)

( * ) Notice: Subject to any disclaimer, the term of this patent is extended or adjusted under 35 U.S.C. 154(b) by 196 days.

(21) Appl. No.: 12/664,638

(22) PCT Filed: Apr. 2, 2008

(86) PCT No.: PCT/JP2008/056609
§ 371 (c)(1),
(2), (4) Date: Apr. 2, 2010

(87) PCT Pub. No.: WO2008/152852
PCT Pub. Date: Dec. 18, 2008

(65) Prior Publication Data
US 2010/0188281 A1    Jul. 29, 2010

(30) Foreign Application Priority Data

Jun. 14, 2007  (JP) .................. 2007-157957
Jul. 31, 2007  (JP) .................. 2007-199973
Dec. 28, 2007  (JP) .................. 2007-341452

(51) Int. Cl.
*G01S 13/00*   (2006.01)
*G01S 13/08*   (2006.01)
*H01Q 1/38*    (2006.01)
*H01Q 13/00*   (2006.01)
*H01Q 1/00*    (2006.01)
*H01P 1/20*    (2006.01)

(52) U.S. Cl. .......... 342/83; 342/118; 342/175; 343/772; 343/905; 343/700 MS; 333/202; 333/204; 333/208

(58) Field of Classification Search .................... 342/83, 342/118, 175; 343/772, 700 MS, 905; 333/202, 333/204, 208
See application file for complete search history.

(56) References Cited

U.S. PATENT DOCUMENTS 3,812,438 A * 5/1974 Hopfer .......................... 333/246
(Continued)

FOREIGN PATENT DOCUMENTS
DE      69405886 T2    4/1998
(Continued)

OTHER PUBLICATIONS

Masayoshi Aikawa et al., "Monolithic Microwave Integrated Circuit (MMIC)" IEICE, pp. 47-48, Jan. 1997 (with English translation).
(Continued)

*Primary Examiner* — Thomas Tarcza
*Assistant Examiner* — Peter Bythrow
(74) *Attorney, Agent, or Firm* — DLA Piper LLP (US)

(57) ABSTRACT

The invention relates to a direct-current blocking circuit, and a hybrid circuit device, a transmitter, a receiver, a transmitter-receiver and a radar device that have the direct-current blocking circuit. A dielectric substrate (2) is provided with a conductor layer (3) disposed parallel with the dielectric substrate (2), first and second planar lines (4, 5) each containing a part of the conductor layer (3), and a waveguide (6) containing a part of the conductor layer (3). The first and second planar lines (4, 5) are located on one surface (2a) side of the dielectric substrate (2) with respect to the conductor layer (3), and the waveguide (6) is located on another surface (2b) side of the dielectric substrate (2). In a transmission direction (X) of electric signals, as to the waveguide (6), its one end overlaps with one end of the first planar line (4), and its another end overlaps with one end of the second planar line (5). In the overlapped regions, first and second through-holes (24, 25) are so formed as to penetrate the conductor layer (3) in its thickness direction.

17 Claims, 18 Drawing Sheets

U.S. PATENT DOCUMENTS

| | | | | |
|---|---|---|---|---|
| 4,006,425 | A * | 2/1977 | Chang et al. | 329/354 |
| 4,521,753 | A * | 6/1985 | Schloemann | 333/204 |
| 4,543,543 | A * | 9/1985 | Blight et al. | 333/24.1 |
| 4,908,615 | A * | 3/1990 | Bayraktaroglu | 340/917 |
| 5,355,104 | A | 10/1994 | Wolfson et al. | |
| 5,396,202 | A * | 3/1995 | Scheck | 333/230 |
| 5,511,238 | A * | 4/1996 | Bayraktaroglu | 455/81 |
| 5,570,093 | A | 10/1996 | Aker et al. | |
| 5,793,263 | A * | 8/1998 | Pozar | 333/26 |
| 5,929,510 | A * | 7/1999 | Geller et al. | 257/635 |
| 6,057,600 | A * | 5/2000 | Kitazawa et al. | 257/728 |
| 6,121,861 | A * | 9/2000 | Yabuki et al. | 333/204 |
| 6,216,020 | B1 * | 4/2001 | Findikoglu | 505/210 |
| 6,239,669 | B1 * | 5/2001 | Koriyama et al. | 333/26 |
| 6,255,745 | B1 * | 7/2001 | Bertsch et al. | 307/105 |
| 6,285,325 | B1 * | 9/2001 | Nalbandian et al. | 343/700 MS |
| 6,476,463 | B1 * | 11/2002 | Kaneko et al. | 257/660 |
| 6,593,834 | B2 * | 7/2003 | Qiu et al. | 333/262 |
| 6,639,558 | B2 * | 10/2003 | Kellerman et al. | 343/700 MS |
| 6,643,924 | B2 * | 11/2003 | Hirabayashi | 29/846 |
| 6,690,251 | B2 * | 2/2004 | Toncich | 333/202 |
| 6,712,284 | B2 * | 3/2004 | Aoki et al. | 257/183 |
| 6,774,748 | B1 * | 8/2004 | Ito et al. | 333/247 |
| 6,812,813 | B2 * | 11/2004 | Mizoguchi et al. | 333/204 |
| 6,833,775 | B2 * | 12/2004 | Buck et al. | 333/204 |
| 6,870,438 | B1 * | 3/2005 | Shino et al. | 333/26 |
| 6,903,687 | B1 * | 6/2005 | Fink et al. | 343/700 MS |
| 6,924,712 | B2 * | 8/2005 | Tabatabai | 333/4 |
| 7,034,640 | B2 * | 4/2006 | Nguyen et al. | 333/238 |
| 7,164,905 | B2 * | 1/2007 | Tamaki et al. | 455/403 |
| 7,193,490 | B2 * | 3/2007 | Shimoda | 333/246 |
| 7,202,755 | B2 * | 4/2007 | Tabatabai | 333/4 |
| 7,265,711 | B2 * | 9/2007 | Hayata et al. | 342/175 |
| 7,286,080 | B2 * | 10/2007 | Sakamoto et al. | 342/175 |
| 7,336,221 | B2 * | 2/2008 | Matsuo et al. | 342/175 |
| 7,394,334 | B2 * | 7/2008 | Okano | 333/134 |
| 7,486,156 | B2 * | 2/2009 | Lee et al. | 333/26 |
| 7,554,418 | B2 * | 6/2009 | Fujita | 333/26 |
| 7,804,443 | B2 * | 9/2010 | Nagaishi et al. | 342/70 |
| 8,081,050 | B2 * | 12/2011 | Kaneda et al. | 333/204 |
| 2007/0109070 | A1 | 5/2007 | Singh | |

FOREIGN PATENT DOCUMENTS

| | | |
|---|---|---|
| JP | 56-103501 | 8/1981 |
| JP | 03-219712 | 9/1991 |
| JP | 10-013274 | 1/1998 |
| JP | 10-142320 | 5/1998 |
| JP | 11-017411 | 1/1999 |
| JP | 11-191707 | 7/1999 |
| JP | 11-214580 | 8/1999 |
| JP | 2000-133735 | 5/2000 |
| JP | 2001-183449 | 7/2001 |
| JP | 2001513307 A | 8/2001 |
| JP | 2006-094303 | 4/2006 |
| JP | 2006-333378 | 12/2006 |

OTHER PUBLICATIONS

German language office action dated Mar. 22, 2012 and its English language translation issued in corresponding German application 112008001621.6 cites the U.S. patent, U.S. patent application publication and foreign patent document above.

* cited by examiner

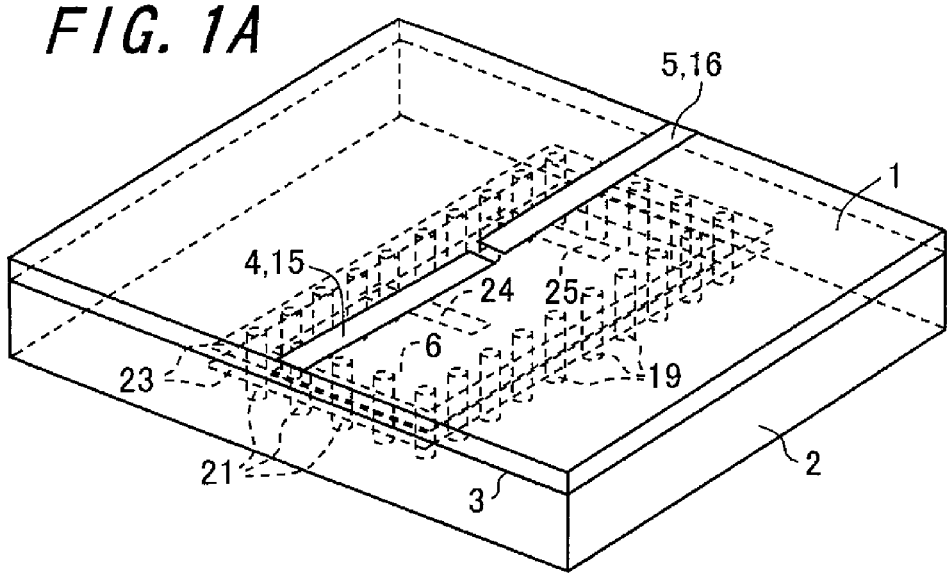
FIG. 1A
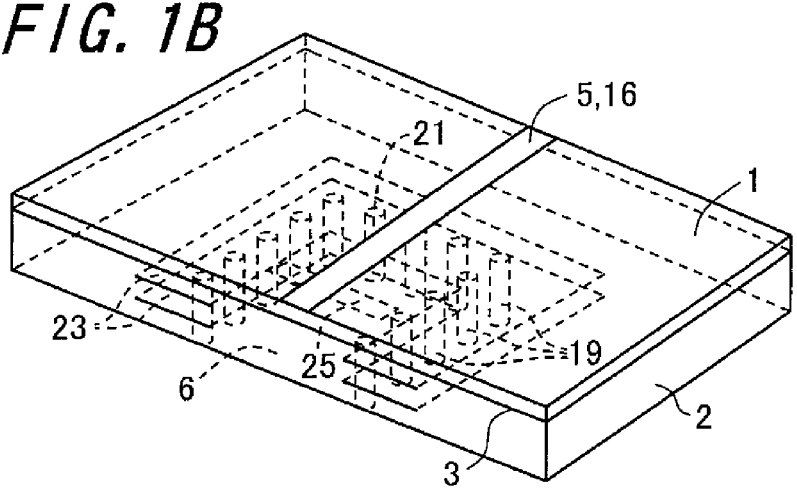
FIG. 1B

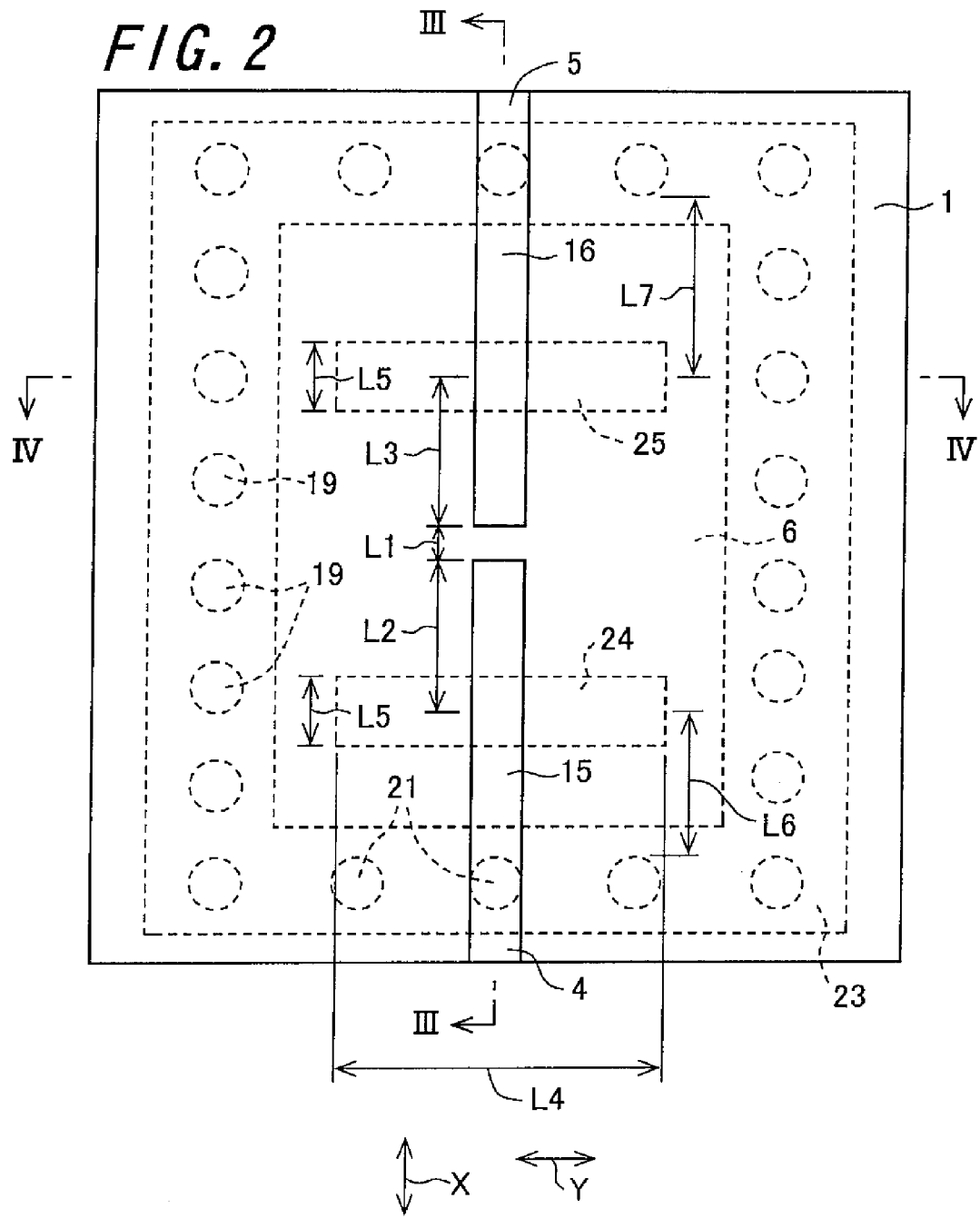

US 8,179,304 B2

DIRECT-CURRENT BLOCKING CIRCUIT, HYBRID CIRCUIT DEVICE, TRANSMITTER, RECEIVER, TRANSMITTER-RECEIVER, AND RADAR DEVICE

CROSS-REFERENCE TO THE RELATED APPLICATIONS

This application is a national stage of international application No. PCT/JP2008/056609, filed on Apr. 2, 2008, and claims the benefit of priority under 35 USC 119 to Japanese Patent Application No. 2007-157957, filed on Jun. 14, 2007, Japanese Patent Application No. 2007-199973, filed on Jul. 31, 2007 and Japanese Patent Application No. 2007-341452, filed on Dec. 28, 2007, the entire contents of all of which are incorporated herein by reference.

TECHNICAL FIELD

The present invention relates to a direct-current blocking circuit for blocking a direct current component of an electric signal and to a hybrid circuit device, a transmitter, a receiver, a transmitter-receiver, and a radar device that have the direct-current blocking circuit.

BACKGROUND ART

In keeping with the recent advanced information-based society, application systems including an information-communication apparatus that utilize a radio-frequency range, such as a microwave band ranging from 1 to 30 GHz and a millimeter-wave band ranging from 30 to 300 GHz, have been proposed for high-speed transmission of large-volume data. Moreover, millimeter wave-using systems such as a radar device for measuring inter-vehicle distance have also been proposed to date.

In order to attain a radio-frequency circuit for use in a radiofrequency range-using system, for example, a waveguide is formed in a dielectric substrate, and an electronic component is mounted thereon. The electronic component is composed of one or a plurality of various semiconductor elements such as a diode and a transistor. A circuit formed in the dielectric substrate is connected to a DC (direct current) power source for applying bias voltage, bias current, or the like to operate the semiconductor element.

If, in the semiconductor element, an unintended input-output terminal receives application of DC voltage, or DC voltage beyond the limit of the rating is applied, the semiconductor element may suffer from performance deterioration or a breakdown. In order to prevent such an unnecessary DC voltage application, under the conventional technology, a capacitor is provided as a direct-current blocking circuit. The examples of such a capacitor include an interdigital capacitor which is formed in a microstrip line, a gap-type capacitor which is constructed by forming a gap in a microstrip line, and a multilayer ceramic capacitor (for example, refer to "Monolithic Microwave Integrated Circuit (MMIC)" written by Masayoshi Aikawa and four other authors (published by the Institute of Electronics, Information and Communication Engineers (IEICE), January 1997 issue, p. 47 to p. 48)).

The interdigital capacitor, as well as the gap-type capacitor, is required to allow passage of radio-frequency signals traveling through the microstrip line with a low loss while blocking a direct current component.

In a case where a direct-current blacking circuit is formed on a ceramic substrate having a specific permittivity of 11 or below, there is a need to provide a reactance component corresponding to the frequency of a radio-frequency signal intended to be transmitted. In a planar circuit such as a microstrip line, a desired reactance component may be formed by making proper adjustment to line-to-line width and length or by adopting a multilayer ceramic capacitor as a direct-current blocking circuit. However, in the fabrication method for transmission lines based on conductor printing and co-firing techniques, since the lower limits of line-to-line width and length are determined in accordance with design rules, it is impossible to obtain the desired reactance component required to transmit radio-frequency signals, especially those in a millimeter-wave band or the like. Accordingly, there arises a large reflection from the direct-current blocking circuit with consequent heavy transmission loss.

Furthermore, in a case where a multilayer ceramic capacitor is used for the direct-current blocking circuit, an inductance component of a metal electrode is so great that its influence is not negligible. This makes it impossible to establish the desired reactance component with the consequence that the reflection of a passing radio-frequency signal becomes so great that the transmission characteristics may be deteriorated.

DISCLOSURE OF INVENTION

An object of the invention is to provide a direct-current blocking circuit that can be manufactured in accordance with design rules based on conductor printing and co-firing techniques, the role of which is to allow transmission of radio-frequency signals without the necessity of using an exiting reactance element while eliminating a direct current component, as well as to provide a hybrid circuit device, a transmitter, a receiver, a transmitter-receiver, and a radar device that have the direct-current blocking circuit.

The invention provides a direct-current blocking circuit comprising a dielectric substrate, a conductor layer, a first planar line, a second planar line, and a waveguide. The conductor layer is formed between one surface and another surface of the dielectric substrate, and comprises a first portion, a second portion, and a third portion. The first planar line includes the first portion of the conductor layer, and is located on the one surface side of the dielectric substrate with respect to the conductor layer. The second planar line includes the second portion of the conductor layer, and is located on the one surface side of the dielectric substrate with respect to the conductor layer, with its one end at a predetermined distance away from one end of the first planar line. The waveguide includes the third portion of the conductor layer, and is located on the other surface side of the dielectric substrate with respect to the conductor layer in such a manner that, in a direction in which an electric signal, is transmitted, its one end overlaps with one end of the first planar line and its another end overlaps with one end of the second planar line. In the conductor layer, in a region where the waveguide and the first planar line overlap, the waveguide and the first planar line are electromagnetically coupled to each other, and also, in a region where the waveguide and the second planar line overlap, the waveguide and the second planar line are electromagnetically coupled to each other.

Moreover, the invention provides a hybrid circuit device comprising a power divider and the direct-current blocking circuit. The power divider has a plurality of terminals for the input and output of electromagnetic waves. In the power divider, electric power supplied from a predetermined one of the terminals is divided and the power is outputted from a different terminal than the predetermined terminal. The first or second planar line of the direct-current blocking circuit are connected to one terminal, of a plurality of terminals of the power divider, that receives electromagnetic wave input.

Moreover, the invention provides a transmitter comprising an oscillator for generating radio-frequency signals, a transmission line, the direct-current blocking circuit mentioned above, and an antenna. The transmission line is connected to the oscillator, and transmits the radio-frequency signal from the oscillator. The direct-current blocking circuit is inserted in the transmission line to allow passage of the radio-frequency signal through the waveguide. The antenna is connected to the transmission line, and radiates the radio-frequency signal.

Moreover, the invention provides a receiver comprising an antenna for acquires radio-frequency signals, a transmission line, the direct-current blocking circuit mentioned above, and a detector. The transmission line is connected to the antenna, and transmits the radio-frequency signal acquired by the antenna. The direct-current blocking circuit is inserted in the transmission line to allow passage of the radio-frequency signal through the waveguide. The detector is connected to the transmission line, and detects the radio-frequency signal transmitted to the transmission line.

Moreover, the invention provides a transmitter-receiver comprising an oscillator for generating radio-frequency signals, a first transmission line, a branch, a second transmission line, a divider, a third transmission line, an antenna, a fourth transmission line, a fifth transmission line, a mixer, and the direct-current blocking circuit mentioned above. The first transmission line is connected to the oscillator, and transmits radio-frequency signals. The branch has a first terminal, a second terminal, and a third terminal, of which the first terminal is connected to the first transmission line. In the branch, a radio-frequency signal fed to the first terminal is selectively outputted to the second terminal or the third terminal. The second transmission line is connected to the second terminal, and transmits a radio-frequency signal fed from the second terminal. The divider has a fourth terminal a fifth terminal, and a sixth terminal. In the divider, a radio-frequency signal fed to the fourth terminal through the second transmission line is outputted to the fifth terminal, and a radio-frequency signal fed to the fifth terminal is outputted to the sixth terminal. The third transmission line is connected to the fifth terminal, and transmits a radio-frequency signal outputted from the fifth terminal and also transmits a radio-frequency signal to the fifth terminal. The antenna is connected to the third transmission line, and radiates and acquires radio-frequency signals. The fourth transmission line is connected to the third terminal, and transmits a radio-frequency signal outputted from the third terminal. The fifth transmission line is connected to the sixth terminal, and transmits a radio-frequency signal outputted from the sixth terminal. The mixer is connected to the fourth and fifth transmission lines, and mixes the radio-frequency signals fed from the fourth transmission line and the fifth transmission line, respectively, to output an intermediate-frequency signal. The direct-current blocking circuit is inserted in at least one of the first to fifth transmission lines to allow passage of the radio-frequency signal through the waveguide.

Moreover, the invention provides a transmitter-receiver comprising an oscillator for generating radio-frequency signals, a first transmission line, a branch, a second transmission line, a divider, a third transmission line, an antenna, a fourth transmission line, a fifth transmission line, and the hybrid circuit device mentioned above. The first transmission line is connected to the oscillator, and transmits radio-frequency signals. The branch has a first terminal, a second terminal, and a third terminal, of which the first terminal is connected to the first transmission line. In the branch, a radio-frequency signal fed to the first terminal is selectively outputted to the second terminal or the third terminal. The second transmission line is connected to the second terminal, and transmits a radio-frequency signal fed from the second terminal. The divider has a fourth terminal, a fifth terminal, and a sixth terminal. In the divider, a radio-frequency signal fed to the fourth terminal through the second transmission line is outputted to the fifth terminal, and a radio-frequency signal fed to the fifth terminal is outputted to the sixth terminal. The third transmission line is connected to the fifth terminal, and transmits a radio-frequency signal outputted from the fifth terminal and also transmits a radio-frequency signal to the fifth terminal. The antenna is connected to the third transmission line, and radiates and acquires radio-frequency signals. The fourth transmission line is connected to the third terminal, and transmits a radio-frequency signal outputted, from the third terminal. The fifth transmission line is connected to the sixth terminal, and transmits a radio-frequency signal outputted from the sixth terminal. The hybrid circuit device is connected to the fourth and fifth transmission lines, and mixes radio-frequency signals fed from the fourth transmission line and the fifth transmission line, respectively, to output an intermediate-frequency signal.

Moreover, the invention provides a transmitter-receiver comprising an oscillator for generating radio-frequency signals, a first transmission line, a branch, a second transmission line, a transmitting antenna, a receiving antenna, a third transmission line, a fourth transmission line, a mixer, and the direct-current blocking circuit mentioned above. The first transmission line is connected to the oscillator, and transmits radio-frequency signals. The branch has a first terminal, a second terminal, and a third terminal, of which the first terminal is connected to the first transmission line. In the branch, a radio-frequency signal fed to the first terminal is selectively outputted to the second terminal or the third terminal. The second transmission line is connected to the second terminal, and transmits a radio-frequency signal fed from the second terminal. The transmitting antenna is connected to the second transmission line, and radiates radio-frequency signals. The receiving antenna acquires radio-frequency signals. The third transmission line is connected to the receiving antenna, and transmits a radio-frequency signal acquired.

The fourth transmission line is connected to the third terminal, and transmits a radio-frequency signal outputted from the third terminal. The mixer is connected to the third and fourth transmission lines, and mixes radio-frequency signals fed from the third transmission line and the fourth transmission line, respectively, to output an intermediate-frequency signal. The direct-current blocking circuit is inserted in at least one of the first to fourth transmission lines to allow passage of a radio-frequency signal through the waveguide.

Moreover, the invention provides a transmitter-receiver comprising an oscillator for generating radio-frequency signals, a first transmission line, a branch, a second transmission line, a transmitting antenna, a receiving antenna, a third transmission line, a fourth transmission line, and the hybrid circuit device. The first transmission line is connected to the oscillator, and transmits radio-frequency signals. The branch has a first terminal, a second terminal, and a third terminal, of which the first terminal is connected to the first transmission line. In the branch, a radio-frequency signal fed to the first terminal is selectively outputted to the second terminal or the third terminal. The second transmission line is connected to the second terminal, and transmits a radio-frequency signal fed from the second terminal. The transmitting antenna is connected to the second transmission line, and radiates redid-frequency signals. The receiving antenna acquires radio-frequency signals. The third transmission line is connected to the receiving antenna, and transmits a radio-frequency signal acquired. The fourth transmission line is connected to the third terminal, and transmits a radio-frequency signal outputted from the third terminal. The hybrid circuit device is connected to the third and fourth transmission lines, and mixes radio-frequency signals fed from the third transmission line and the fourth transmission line, respectively, to output an intermediate-frequency signal.

Further, the invention provides a radar device comprising the transmitter-receiver mentioned above and a distance detector. The distance detector detects a distance from the transmitter-receiver to an object to be detected on the basis of the intermediate-frequency signal from the transmitter-receiver.

BRIEF DESCRIPTION OF DRAWINGS

Other and further objects, features, and advantages of the invention will be more explicit from the following detailed description taken with reference to the drawings wherein:

FIG. 1A is a perspective view showing a direct-current blocking circuit in accordance with a first embodiment of the invention;

FIG. 1B is a perspective view showing the direct-current blocking circuit in accordance with the first embodiment of the invention;

FIG. 2 is a plan view showing the direct-current blocking circuit;

BEST MODE FOR CARRYING OUT THE INVENTION

Figure 3:
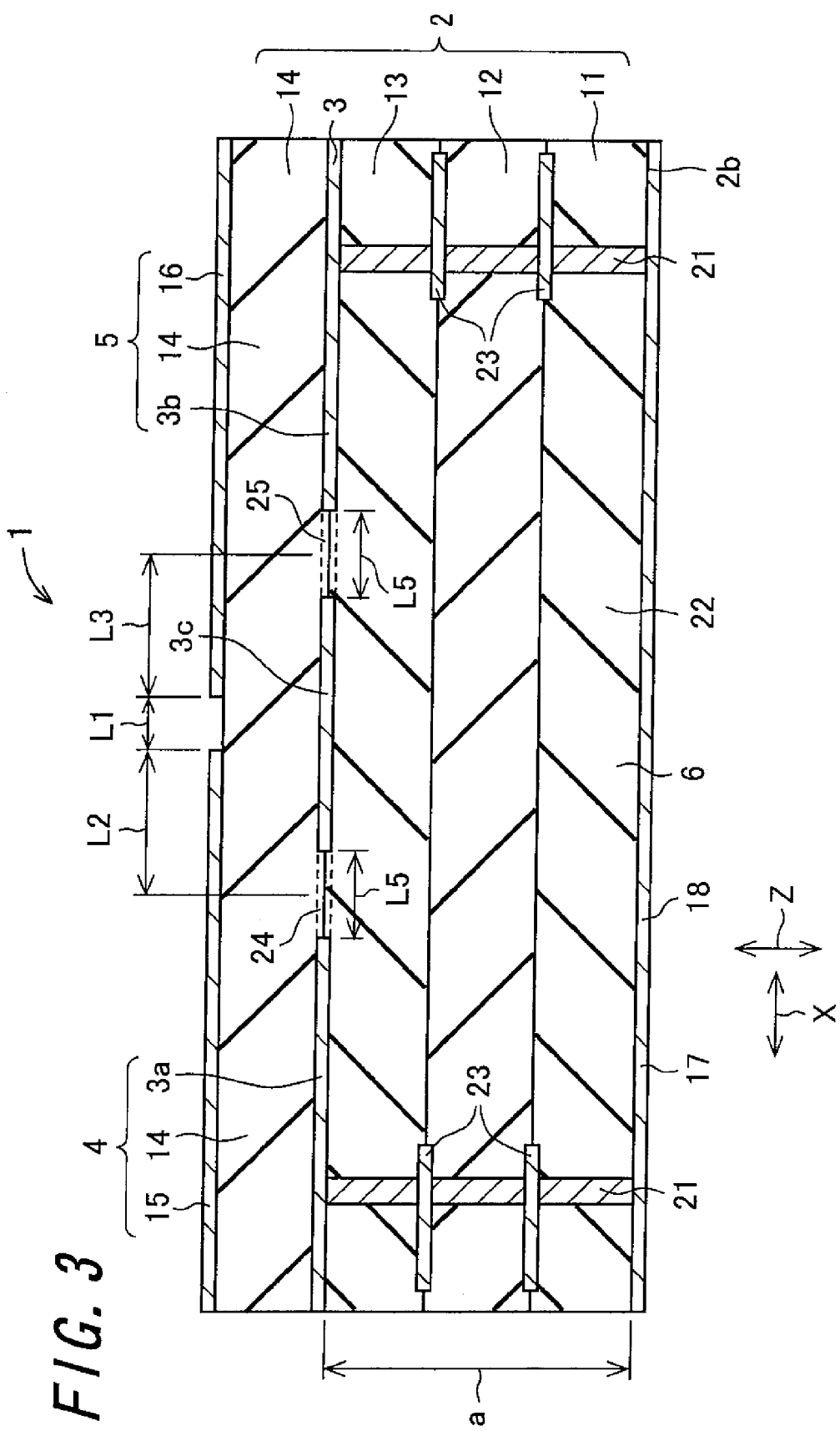
FIG. 3 is a sectional view of the direct-current blocking circuit taken along the line of III-III of FIG. 2.

Now referring to the drawings, preferred embodiments of the invention are described below.

First Embodiment

Figure 4:
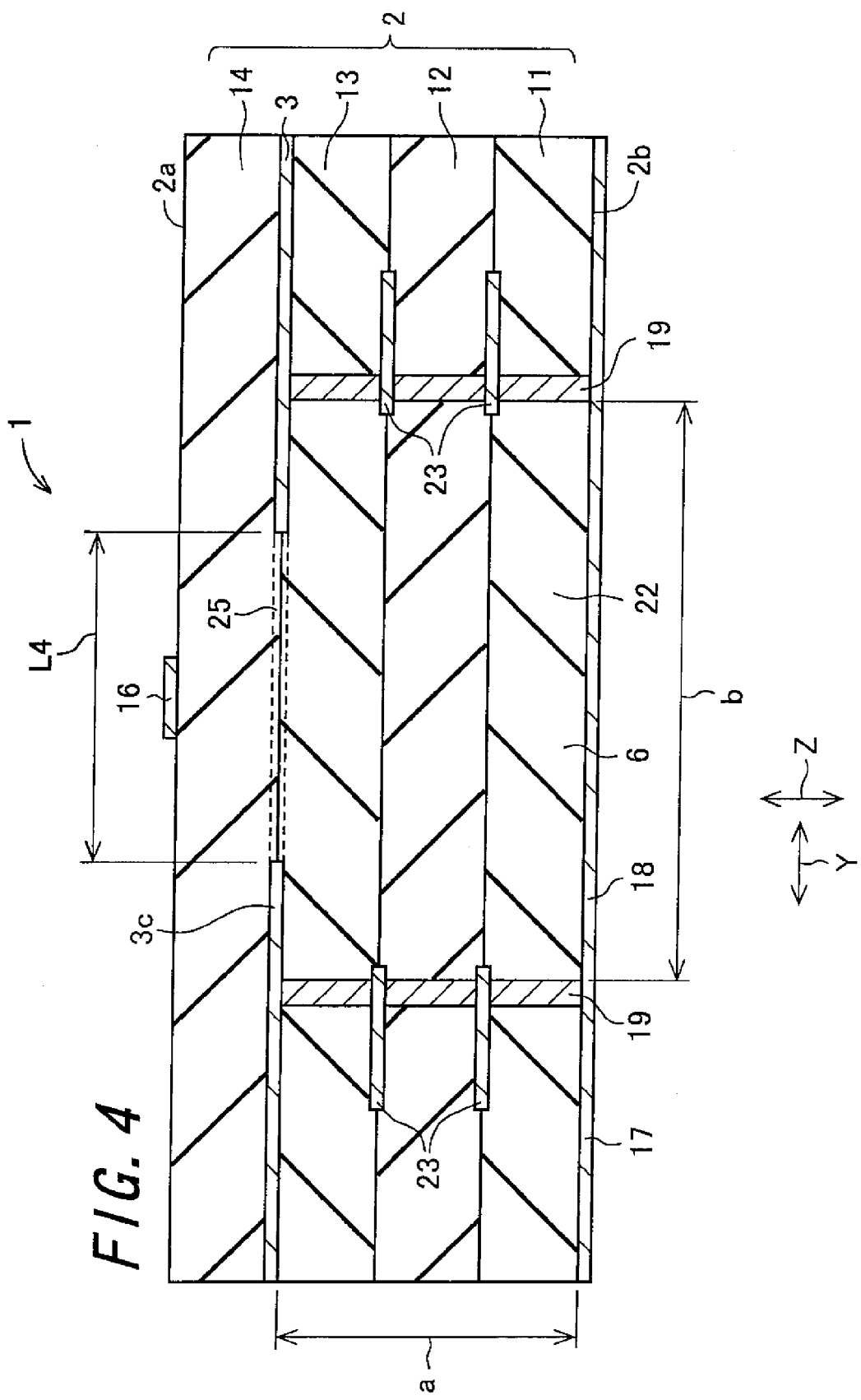
FIG. 4 is a sectional view of the direct-current blocking circuit taken along the line IV-IV of FIG. 2.

FIGS. 1A and 1B are perspective views showing a direct-current blocking circuit 1 in accordance with a first embodiment of the invention. FIG. 2 is a plan view showing the direct-current blocking circuit 1. FIG. 3 is a sectional view of the direct-current blocking circuit 1 taken along the line III-III of FIG. 2. FIG. 4 is a sectional view of the direct-current blocking circuit 1 taken along the line IV-IV of FIG. 2. The direct-current blocking circuit 1, while blocking passage of a direct current electric signal, allows an electric signal having an intended frequency to pass therethrough with a low transmission loss. For example, the direct-current blocking circuit 1 is capable of blocking a direct current component in a state of being incorporated in part of a circuit formed on a wiring substrate. However, in order to simplify an understanding of the invention, the following description of this embodiment deals with the direct-current blocking circuit 1 alone. FIG. 1A is a perspective view showing the direct-current blocking circuit 1 as a whole, and FIG. 1B is a perspective view of the direct-current blocking circuit 1 sectioned perpendicularly with respect to a transmission direction X in which an electric signal is transmitted.

The direct-current blocking circuit 1 includes a dielectric substrate 2, a conductor layer 3, a first planar line 4, a second planar line 5, and a waveguide 6. The conductor layer 3 is formed between one surface 2a and another surface 2b of the dielectric substrate 2 so as to run parallel with the one surface 2a, and includes a first portion 3a, a second portion 3b, and a third portion 3c. The first planar line 4 includes the first portion 3a of the conductor layer 3, and is located on the one surface 2a side of the dielectric substrate 2 with respect to the conductor layer 3. The second planar line 5 includes the second portion 3b of the conductor layer 3, and is located on the one surface 2a side of the dielectric substrate 2 with respect to the conductor layer 3, with its one end spaced a predetermined-distance L1 away from one end of the first planar line 4. The waveguide 6 includes the third portion 3c of the conductor layer 3, and is located on the other surface 2b side of the dielectric substrate 2 with respect to the conductor layer 3 in such a manner that, in the electric-signal transmission direction X, its one end overlaps with one end of the first planar line 4 and its another end overlaps with one end of the second planar line 5.

The dielectric substrate 2 is constructed by stacking a plurality of dielectric layers. In the present embodiment, first to fourth dielectric layers 11, 12, 13, and 14 are stacked on top of each other in the order named thereby to constitute the dielectric substrate 2. Moreover, as will hereinafter be described, the dielectric substrate 2 is formed by stacking ceramic green sheets and then firing the stacked body. Although it is impossible to make a positive distinction between the ceramic green sheets following the completion of firing, the stacked ceramic green sheets respectively correspond to the illustrated dielectric layers.

The conductor layer 3 has electrical conductivity and is, in the present embodiment, disposed between the third dielectric layer 13 and the fourth dielectric layer 14. The conductor layer 3 is so formed as to extend over the entire area between the third and fourth dielectric layers 13 and 14, and serves as part of the first and second planar lines 4 and 5 and serves also as part of the waveguide 6.

The first and second planar lines 4 and 5 are implemented by using a strip line, a microstrip line, a slot line, a coplanar line, or the like, for example. In the present embodiment, a microstrip line is adopted for use. The first planar line 4 includes a first strip conductor 15 formed on one surface 2a of the dielectric, substrate 2 in its thickness direction (hereinafter referred to as "vertical direction Z") so as to extend in the transmission direction X; the first portion 3a of the conductor layer 3 that serves as a so-called grounding conductor; and part of the fourth dielectric layer 14. The second planar line 5 includes a second strip conductor 16 formed on one surface 2a of the dielectric substrate 2 in the vertical direction Z so as to extend in the transmission direction X; the second portion 3b of the conductor layer 3 that serves as a so-called grounding conductor; and part of the fourth dielectric layer 14. The first and second strip conductors 15 and 16 are each made of an electrically conductive material. In the present embodiment, the first and second strip conductors 15 and 16 are each disposed in the form of a straight line extending over the midportion of the waveguide 6 in its width direction Y along the transmission direction X, when viewed from one side in the vertical direction Z. The conductor layer 3, which serves as a grounding conductor, may be electrically connected to a housing or the like so as to exhibit a potential equivalent to a reference potential, or may be electrically connected to a power source circuit so as to exhibit a potential equivalent to a power source potential. The first portion 3a is that part of the conductor layer 3 which serves as the grounding conductor of the first planar line 4. The second portion 3b is that part of the conductor layer 3 which serves as the grounding conductor of the second planar line 5.

The direct-current blocking circuit 1 of the present embodiment includes additionally a back conductor layer 17 formed so as to cover the entire area of the other surface 2b of the dielectric substrate 2. The back conductor layer 17 has electrical conductivity and serves as part of the waveguide 6.

The waveguide 6 of the present embodiment is built as a multilayer waveguide composed of a bottom conductor layer 18, a plurality of side-wall conductor columns 19, and a plurality of shielding conductor columns 21. The bottom conductor layer 18 is disposed in parallel with the conductor layer 3. A plurality of the side-wall conductor columns 19 have electrical conductivity and are so formed as to extend between the conductor layer 3 and the bottom conductor layer 18. The side-wall conductor columns 19 are arranged in two rows along the transmission direction X so that a distance therebetween in the transmission direction X is shorter than or equal to a cutoff wavelength. A plurality of the shielding conductor columns 21 are located at each of one end and the other end of the waveguide in the radio-frequency signal transmission direction X. The shielding conductor columns 21 have electrical conductivity, are so formed as to extend between the conductor layer 3 and the bottom conductor layer 18, and are arranged to be apart from each other in the width direction Y which is perpendicular to the transmission direction X and the thickness direction of the dielectric substrate 2 (vertical direction Z) by a distance shorter than or equal to the cutoff wavelength.

A part of the first to third dielectric layers 11, 12, and 13 which is surrounded by the third portion 3c of the conductor layer 3, the back conductor layer 17, a plurality of the side-wall conductor columns 19, and a plurality of the shielding conductor columns 21 serves as a waveguide path 22 of the waveguide 6 through which radio-frequency signals are passed. The side-wall conductor columns 19 are arranged along the transmission direction X in a distance less than or equal to the cutoff wavelength one from another. With this arrangement, a plurality of the side-wall conductor columns 19 act to prevent outside leakage of a radio-frequency signal traveling through the waveguide path 22 from the waveguide 6 and thus confine the radio-frequency signal within the waveguide path 22. That is, where radio-frequency signals traveling through the waveguide path 22 are concerned, a plurality of the side-wall conductor columns 19 function just like a platy conductor extending in the transmission direction X perpendicularly to the width direction Y. Similarly, the shielding conductor columns 21 act to prevent outside leakage of a radio-frequency signal traveling through the waveguide path 22 from the waveguide 6 and thus confine the radio-frequency signal within the waveguide path 22. Accordingly, the waveguide 6 of the present embodiment functions just like a rectangular parallelepiped waveguide. Moreover, with the provision of the shielding conductor columns 21, a radio-frequency signal transmitted to the waveguide 6 from one of the first planar line and the second planar line 5 can be prevented from leaking from the waveguide 6 without being transmitted to the other of the first planar line and the second planar line 5. This helps reduce the loss of transmission of radio-frequency signals traveling through the direct-current blocking circuit 1. The bottom conductor layer 18 corresponds to that part of the back conductor layer 17 which faces the waveguide path 22. Moreover, the third portion 3c corresponds to that part of the conductor layer 3 which faces the waveguide path 22.

Each of the side-wall conductor column 19 and the shielding conductor column 21 may be designed in any given shape. For example, it may have a circular, elliptic, or polygonal cross-sectional profile taken on a plane perpendicular to the vertical direction Z, or may be so shaped that its cross-sectional profile taken on a plane perpendicular to the vertical direction Z varies from part to part in the vertical direction Z. In the present embodiment, the side-wall conductor column 19 and the shielding conductor column 21 have the shape of a circular column.

A thickness a of the waveguide path 22 in the vertical direction Z and a width b of the waveguide path 22 in the width direction Y are each determined in accordance with the cutoff wavelength and the range of frequency of radio-frequency signals to be passed through the waveguide path 22, so that the radio-frequency signal can be passed through the waveguide path 22 with the intended mode, in-waveguide wavelength, and transmission loss. The thickness a of the waveguide path 22 in the vertical direction Z is equivalent to the interval in the vertical direction Z between the conductor layer 3 and the bottom conductor layer 18. The width b of the waveguide path 22 in the width direction Y is equivalent to the interval in the width direction Y between the opposed side-wall conductor columns 19.

The waveguide 6 may further include one or a plurality of electric conducting sub-layers 23. In the present embodiment, the waveguide 6 includes two electric conducting sub-layers 23. One of the two electric conducting sub-layers 23 is disposed between the first dielectric layer 11 and the second dielectric layer 12, and the other is disposed between the second dielectric layer 12 and the third dielectric layer 13. The electric conducting sub-layers 23 are each shaped like a frame. Specifically, each of the electric conducting sub-layers 23 is so, formed as to encircle the waveguide path 22 on a virtual plane perpendicular to the vertical direction Z, for establishing connection between the adjacent side-wall conductor columns 19 and connection between the adjacent shielding conductor columns 21 as well. In the present embodiment, the electric conducting sub-layer 23 has a strip-like shape, and the side-wall conductor columns 19 and the shielding conductor columns 21 pass completely through the electric conducting sub-layer 23 in the vertical direction Z. The electric conducting sub-layer 23 is so shaped as to protrude slightly toward the waveguide path 22 beyond the side-wall conductor columns 19 and the shielding conductor columns 21 and also protrude in a direction away from the waveguide path 22 beyond the side-wall conductor columns 19 and the shielding conductor columns 21.

With the provision of the electric conducting sub-layers 23 that encircle the waveguide path 22, the radio-frequency signal traveling through the waveguide path 22 can be confined more securely. In this way, the leakage of the radio-frequency signal can be prevented more reliably, and also interlayer misalignment between the side-wall conductor columns 19 and between the shielding conductor columns 21 can be buffered. This makes it possible to produce a waveguide path unsusceptible to a manufacturing variability.

The waveguide 6 is so formed as to extend in the transmission direction X, with its one end overlapping with one end of the first planar line 4 and its another end overlapping with one end of the second planar line 5 in the transmission direction X. That is, the waveguide 6 and the first planar line 4 overlap in part, and the waveguide 6 and the second planar line 5 overlap in part as well when viewed from one side in the vertical direction Z. In the region where the first planar line 4 and the waveguide 6 overlap, the first portion 3a serving as part of the first planar line 4 and the third portion 3c serving as part of the waveguide 6 overlap each other. In the region where the second planar line 5 and the waveguide 6 overlap, the second portion 3b serving as part of the second planar line 5 and the third portion 3c serving as part of the waveguide 6 overlap each other. That is, in the conductor layer 3, the first portion 3a, the second portion 3b, and the third portion 3c do not necessarily have to be arranged independently of one another without mutual overlaps. In the present embodiment, the first portion 3a and the third portion 3c overlap in part, and the second portion 3b and the third portion 3c overlap in part as well.

In the conductor layer 3, in the region where the waveguide 6 and the first planar line 4 overlap in the transmission direction X, the waveguide 6 and the first planar line 4 are electromagnetically coupled to each other. In the present embodiment, a thicknesswisely-penetrated first through-hole 24 is formed in the region where the waveguide 6 and the first planar line 4 overlap, so that the waveguide 6 and the first planar line 4 can be electromagnetically coupled to each other. Moreover, in the conductor layer 3, in the region where the waveguide 6 and the second planar line 5 overlap in the transmission direction X, the waveguide 6 and the second planar line 5 are electromagnetically coupled to each other. In the present embodiment, a thicknesswisely-penetrated second through-hole 25 is formed in the region where the waveguide 6 and the second planar line 5 overlap, so that the waveguide 6 and the second planar line 5 can be electromagnetically coupled to each other. The shape of each of the first and second through-holes 24 and 25 is so selected as to achieve a strong electromagnetic coupling between the waveguide 6 and the first and second planar lines 4 and 5. In the present embodiment, the first and second through-holes 24 and 25 are each so formed as to extend in the width direction Y in a rectangular parallelepiped shape, with their width Y midportions aligned with the width Y midportions of the first and second strip conductors 15 and 16, respectively, when viewed from one side in the vertical direction 3.

Hereinafter, the dimension of the direct-current blocking circuit 1 will be described. In the following description, the wavelength of a radio-frequency signal having the intended frequency within the dielectric substrate 2 will be expressed as "$\lambda a$", and one of the in-waveguide wavelengths within the waveguide 6 will be expressed as "$\lambda g$".

A predetermined spacing L1 is secured between one end of the first planar line 4 and one end of the second planar line 5 in the transmission direction X. Given that the frequency of the radio-frequency signal for use is 76.5 GHz and the specific permittivity of the dielectric substrate 2 is 9.4, then the predetermined spacing L1 is selected to be greater than or equal to 30 μm. By setting the predetermined spacing L1 in that way, it is possible to adjust the transmission coefficient between the first planar line 4 and the second planar line 5 to −15 dB or above. Particularly, by setting the predetermined spacing L1 at or above 70 μm, it is possible to reduce the reflection between the first planar line 4 and the second planar line 5, as well as to adjust the transmission coefficient to −2 dB or above.

The upper limit of the spacing L1 is determined in consideration of the size of the substrate on which is disposed the direct-current blocking circuit 1. If the spacing L1 is smaller than the predetermined value, for example, part of the radio-frequency signal traveling through the first planar line 4 will be further transmitted to the second planar line 5 beyond the gap between the lines defined as the spacing L1. In this case, the planar line-to-planar line coupling, namely the coupling between the first and second planar lines 4 and 5 becomes predominant with the consequence that the strength of the electromagnetic coupling via the first and second through-holes 24 and 25 is decreased. Moreover, it is possible to prevent the radio-frequency signal transmitted beyond the spacing L1 from superimposing itself on the radio-frequency signal transmitted through the waveguide 6 with an undesired phase difference.

Moreover, when viewed from one side in the vertical direction Z, a length L2 between the position of the first planar line 4 aligned with the center of the first through-hole 24 in the transmission direction X and one end of the first planar line 4 is so selected as to be $\lambda a/4$. Similarly, when viewed from one side in the vertical direction Z, a length L3 between the position of the second planar line 5 aligned with the center of the second through-hole 25 in the transmission direction X and one end of the second planar line 5 is so selected as to be $\lambda a/4$. In other words, the lengths L2 and L3 are each so selected as to be a quarter of the electrical length since the lengths L2 and L3 are selected in such a manner, for example, when the radio-frequency signal which is transmitted through the first planar line 4 from one end to the other end thereof in the transmission direction X is reflected from the end and then returned to the first through-hole 24, then the electric signal at the first through-hole 24 differs in phase by π (rad) between its progressive wave and reflected wave with consequent mutual wave cancellation. This makes it possible to suppress reflection of the radio-frequency signal transmitted through the first planar line 4. By the same token, reflection of the radio-frequency signal transmitted through the second planar line 5 can be suppressed. If the above-mentioned spacing L1 is smaller than the predetermined value, for example, part of the electric signal traveling through the first planar line 4 will be further transmitted to the second planar line 5 beyond the gap defined as the spacing L1, wherefore the effect of suppressing radio-frequency signal reflection produced by the mutual cancellation between the progressive wave and the reflected wave is inconveniently decreased. However, since the spacing L1 is so selected as to be greater than or equal to the predetermined value, it is possible to prevent the radio-frequency signal from being transmitted beyond the gap defined as the spacing L1, and thereby suppress radio-frequency signal reflection effectively.

The shape of each of the first and second through-holes 24 and 25 is so selected as to achieve a strong electromagnetic coupling between the waveguide 6 and the first and second planar lines 4 and 5. In the present embodiment, a width L4 of each of the first and second through-holes 24 and 25 in the width direction Y is so selected as to be $\mu a/2$, and a width L5 thereof in the transmission direction X is so selected as to be $0.1 \times \lambda a$. Given that the frequency of the electric signal for use is 76.5 GHz and the specific permittivity of the dielectric substrate 2 is 9.4, then the width L4 of each of the first and second through-holes 24 and 25 in the width direction, Y is so selected as to be 860 μm, and the width L5 thereof in the transmission direction X is so selected as to be 170 μm.

Moreover, a length L6 between the center of the first through-hole 24 in the transmission direction X and one end of the waveguide 6 in the transmission direction X and a length L7 between the center of the second through-hole 25 in the transmission direction X and the other end of the waveguide 6 in the transmission direction X are each so selected as to be greater than zero but less than half of $\lambda g$ which is one of the in-waveguide wavelengths. In the present embodiment, the lengths L6 and L7 are each so selected as to be $\lambda g/4$. By doing so, in the electric signal propagating along the waveguide path 22 after passing through the first through-hole 24, the phase difference between the progressive wave and the reflected wave resulting from reflection from the shielding conductor column 21 near the second through-hole 25 becomes $\pi$ (rad) with consequent mutual wave cancellation. This makes it possible to reduce the reflected wave which returns to the first through-hole 24. Similarly, the reflected wave resulting from reflection of the electric signal transmitted after passing through the second through-hole 25, which returns to the second through-hole 25, can also be reduced.

The length of the waveguide 6 in the transmission direction X is so selected as to be greater than or equal to $\lambda g$ which is one of the in-waveguide wavelengths. In the present embodiment, the length of the waveguide 6 in the transmission direction X is expressed as: L1+L2+L3+L6+L7, and is so selected as to be $L1+\lambda a/2+\lambda g/2$. Since $\lambda a$ is less than or equal to $\lambda g$, a relational expression: $(\lambda a/2+\lambda g/2) \leq \lambda g$ is fulfilled on every occasion. Accordingly, by adjusting the length of the waveguide 6 in the transmission direction X to $\lambda g$ or above, it is possible to attain the waveguide 6 which fulfills the aforementioned length conditions: L1, L2, L3, L6, and L7.

Hereinafter, the method of manufacturing the direct-current blocking circuit 1 will be described. At first, a suitable organic solution or solvent is admixed in powder of raw materials such as alumina and silica ($SiO_2$) to prepare a slurry-like admixture. Next, the slurry-like admixture is molded into ceramic green sheets by means of the doctor blade technique, the calender roll technique, or the like. In this way, there are prepared ceramic green sheets for the first to fourth dielectric layers 11, 12, 13, and 14.

Next, through-holes for the formation of the side-wall conductor columns 19 and the shielding conductor columns 21 are formed in the ceramic green sheets for the first to fourth dielectric layers 11, 12, 13, and 14 by means of die stamping, punching, laser processing, or otherwise. Subsequently, the resultant through-holes are each filled with a metallized paste by means of printing such as the screen printing method, and also, for the formation of the conductor layer 3, the back conductor layer 17, the electric conducting sub-layer 23, and the first and second strip conductors 15 and 16, a metallized paste is print-coated on the ceramic green sheets.

Next, the ceramic green sheets for the first to fourth dielectric layers 11, 12, 13, and 14 with the metallized pastes print-coated thereon are stacked on top of each other, and the stacked body is fired at a temperature as high as ca. 1500° C. to 1800° C. In this way, the direct-current blocking circuit 1 can be fabricated.

The conductor layer 3, the first strip conductor 15, the second strip conductors 16, the back conductor layer 17, the side-wall conductor column 19, the shielding conductor column 21, and the electric conducting sub-layer 23 are each made of an electrically conductive metal such as Cu (copper), Ag (silver), W (tungsten), Mo (molybdenum), Al (aluminum), Ni (nickel), and Au (gold), More specifically, in a case of constructing the dielectric substrate 2 of alumina, the aforementioned constituent components are made of a metal material having a high melting point such as W, Mo, or the like, whereas in a case of constructing the dielectric substrate 2 of glass ceramic, they are made of Cu, Ag, or the like.

In the direct-current blocking circuit 1 of the present embodiment thus far described, the first planar line 4 and the waveguide 6 are electromagnetically coupled to each other via the first through-hole 24, and the second planar line 5 and the waveguide 6 are electromagnetically coupled with each other via the second through-hole 25. Accordingly, for example, an electronic signal traveling through the first planar line 4 passes through the first through-hole 24 to be transmitted to the waveguide 6, and whereafter passes through the second through-hole 25 to be transmitted to the second planar line 5. That is, the waveguide 6 acts as the connection between the first planar line 4 and the second planar line 5.

With the predetermined spacing L1 secured between the first planar line 4 and the second planar line 5, a direct current component is unable to travel through the waveguide 6 with the consequence that it is blocked in the direct-current blocking circuit 1 without being transmitted from one of the first and second planar lines 4 and 5 to the other. Moreover, by making proper adjustment to the shapes of the first and second through-holes 24 and 25, it is possible to lessen the degree of impedance mismatching at the location of connection between the waveguide 6 and the first and second planar lines 4 and 5, and thereby reduce the loss of transmission of an alternate current component from one of the first and second planar lines 4 and 5 to the other via the waveguide 6. This allows the direct-current blocking circuit 1 capable of eliminating a direct current component with low transmission loss to be attained. Moreover, where the first and second planar lines 4 and 5 and the waveguide 6 are concerned, in contrast to a direct-current blocking circuit such as an interdigital capacitor and a gap-type capacitor, the transmission characteristics are uninfluenced by a reactance component between the microstrip lines. Therefore, by virtue of the location at which the waveguide 6 and the first and second planar lines 4 and 5 are electromagnetically coupled to each other, namely the first and second through-holes 24 and 25, the positions of input/output ports can be determined independently. This makes it possible to determine input/output positions in conformity with the circuit configuration.

Moreover, with the provision of the electric conducting sub-layer 23, even if there arises slight misalignment between the through-holes of different layers for the formation of the side-wall conductor columns 19 and the shielding conductor columns 21 during stacking of the ceramic green sheets for the first to fourth dielectric layers 11, 12, 13, and 14, the side-wall conductor columns 19 as well as the shielding conductor columns 21 at the different layers can be electrically connected to each other via the electric conducting sub-layer 23, and also the conductor layer 3 and the bottom conductor layer 18 can be electrically connected to each other via the side-wall conductor columns 19 and the shielding conductor columns 21. In this way, even if there arises layer misalignment during stacking of the ceramic green sheets, an electric signal can be confined within the waveguide path 22 by the side-wall conductor columns 19 and the shielding conductor columns 21. This allows the waveguide 6 which operates with low transmission loss to be attained.

Moreover, with the provision of the shielding conductor columns 21 at one end and the other end of the waveguide 6, it is possible to prevent leakage of the electric signal traveling through the waveguide 6 from one end and the other end as well.

While, in the present embodiment, the waveguide 6 is constructed by stacking the ceramic green sheets, it may be designed in the form of a dielectric waveguide or a hollow waveguide embedded in the dielectric substrate 2. Moreover, while the dielectric substrate 2 is made of ceramics, it may be made of a resin material, a liquid crystal polymer, a mixture of resin and ceramics, or the like.

Second Embodiment

Figure 5:
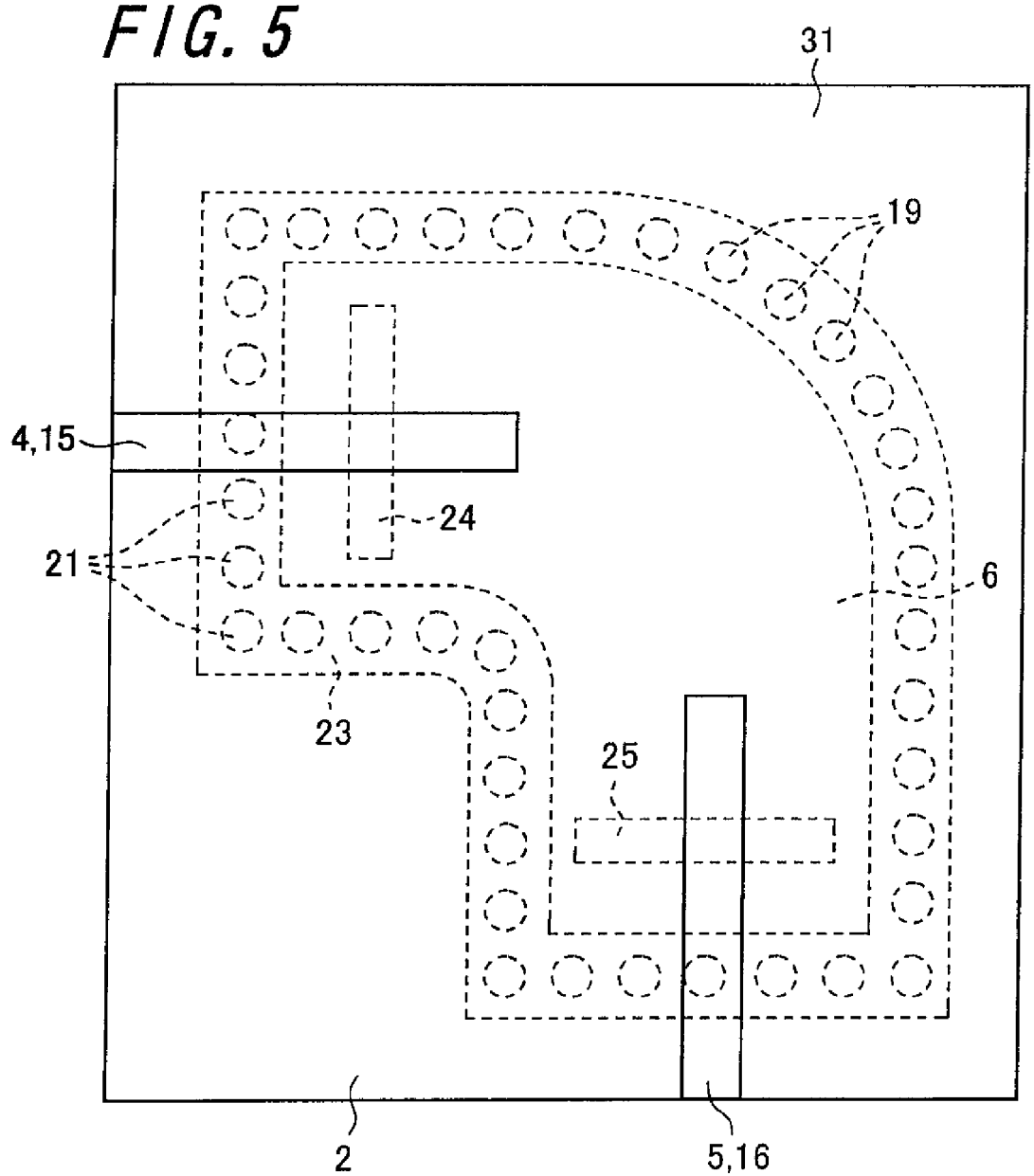
FIG. 5 is a plan view showing the direct-current blocking circuit in accordance with a second embodiment of the invention.

FIG. 5 is a plan view showing a direct-current blocking circuit 31 in accordance with a second embodiment of the invention. In the direct-current blocking circuit 1 of the above-mentioned embodiment, the first planar line 4, the second planar line 5, and the waveguide 6 are arranged in the form of a rectilinear figure when viewed from one side in the vertical direction Z. However, the arrangement is not limited to a rectilinear form but may be a curvilinear form. The direct-current blocking circuit 31 of this embodiment is substantially the same in structure as the direct-current blocking circuit 1 of the above-mentioned embodiment, and therefore the components that play the same or corresponding roles as in the above-mentioned embodiment will be denoted by the same reference symbols, and overlapping descriptions will be omitted occasionally.

In this embodiment, the waveguide 6 is disposed in the form of a curvilinear figure. Specifically, the waveguide 6 has the shape of the letter L; that is, a direction in which its one end extends and a direction in which its another end extends form a right angle. The first planar line 4 is so formed as to extend in the same direction as the extending direction of one end of the waveguide 6, and the second planar line 5 is so formed as to extend in the same direction as the extending direction of the other end of the waveguide 6. That is, the extending direction of the first planar line 4 and the extending direction of the second planar line 5 form a right angle. In this structure, for example, the radio-frequency signal supplied from the first planar line 4 makes a right-angle turn in the waveguide 6 so as to be outputted from the second planar line 5. In this way, by arranging the first planar line 4, the second planar line 5, and the waveguide 6 in the form of a curvilinear figure when viewed from one side in the vertical direction Z, it is possible to arbitrarily change the direction in which the radio-frequency signal is transmitted. Alternatively, the waveguide 6 may be designed to have the shape of the letter U, for example. In this case, the first planar line 4 is so formed as to extend in the same direction as the extending direction of one end of the waveguide 6, and the second planar line 5 is so formed as to extend in the same direction as the extending direction of the other end of the waveguide 6. By arranging the first planar line 4 and the second planar line 5 in parallel with each other in this way, it is possible to allow the radio-frequency signal to make a 180-degree turn during its transmission.

In the location where the radio-frequency signal changes its traveling direction, a transmission loss occurs to a larger extent. However, in a case where the waveguide 6 is smaller in transmission loss than the planar line, by assigning the waveguide 6 to the location where the radio-frequency signal changes its traveling direction, it is possible to change the direction of transmission of the radio-frequency signal with a low transmission loss. As has, already been described, being constructed by stacking ceramic green sheets, the waveguide 6 of the present embodiment can be formed in any given shape with ease. This allows easy attainment of the direct-current blocking circuit/capable of changing the direction of radio-frequency signal transmission with a low transmission loss and blocking a direct current component.

Moreover, also in a case of imparting a curvilinear figure to at least one of the first and second planar lines 4 and 5, the direction of radio-frequency signal transmission can be arbitrarily changed. Further, by exploiting a marriage with a waveguide branch circuit or a waveguide distribution circuit, it is possible to incorporate a radio-frequency circuit into the substrate and thereby achieve further miniaturization.

Third Embodiment

Figure 6A:
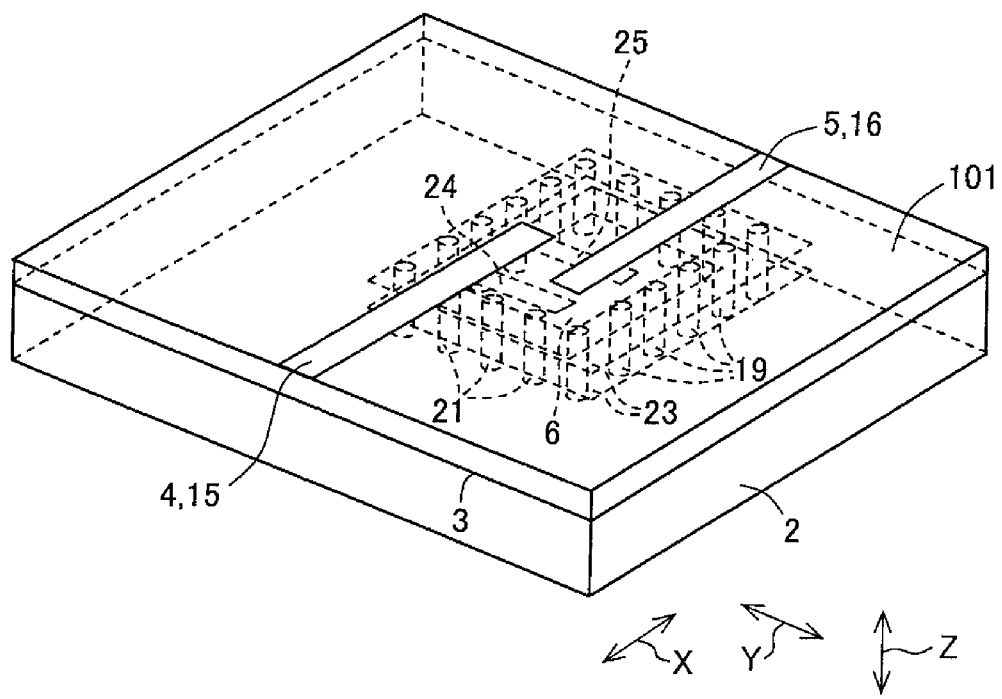
FIG. 6A is a perspective view showing the direct-current blocking circuit in accordance with a third embodiment of the invention.
Figure 6B:
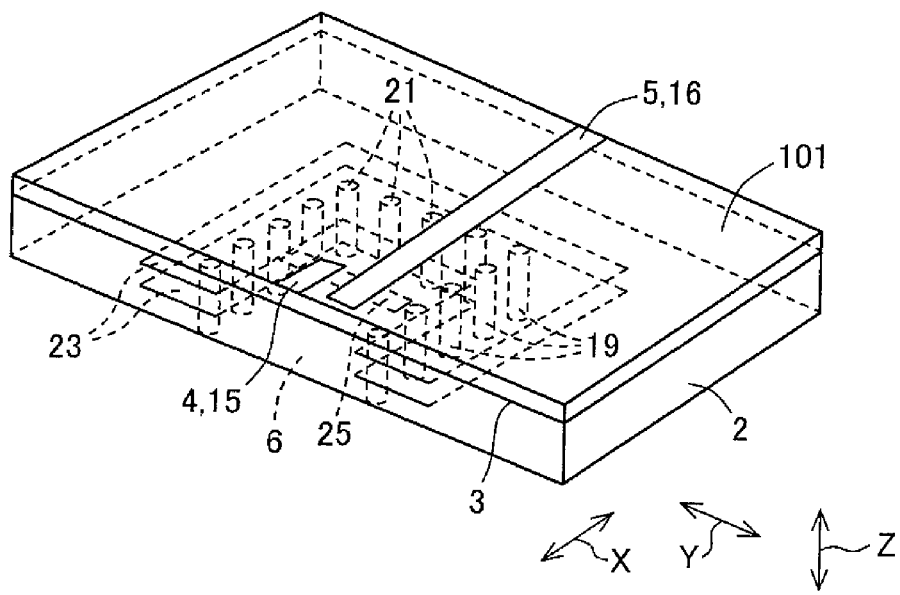
FIG. 6B is a perspective view showing the direct-current blocking circuit in accordance with the third embodiment of the invention.
Figure 7:
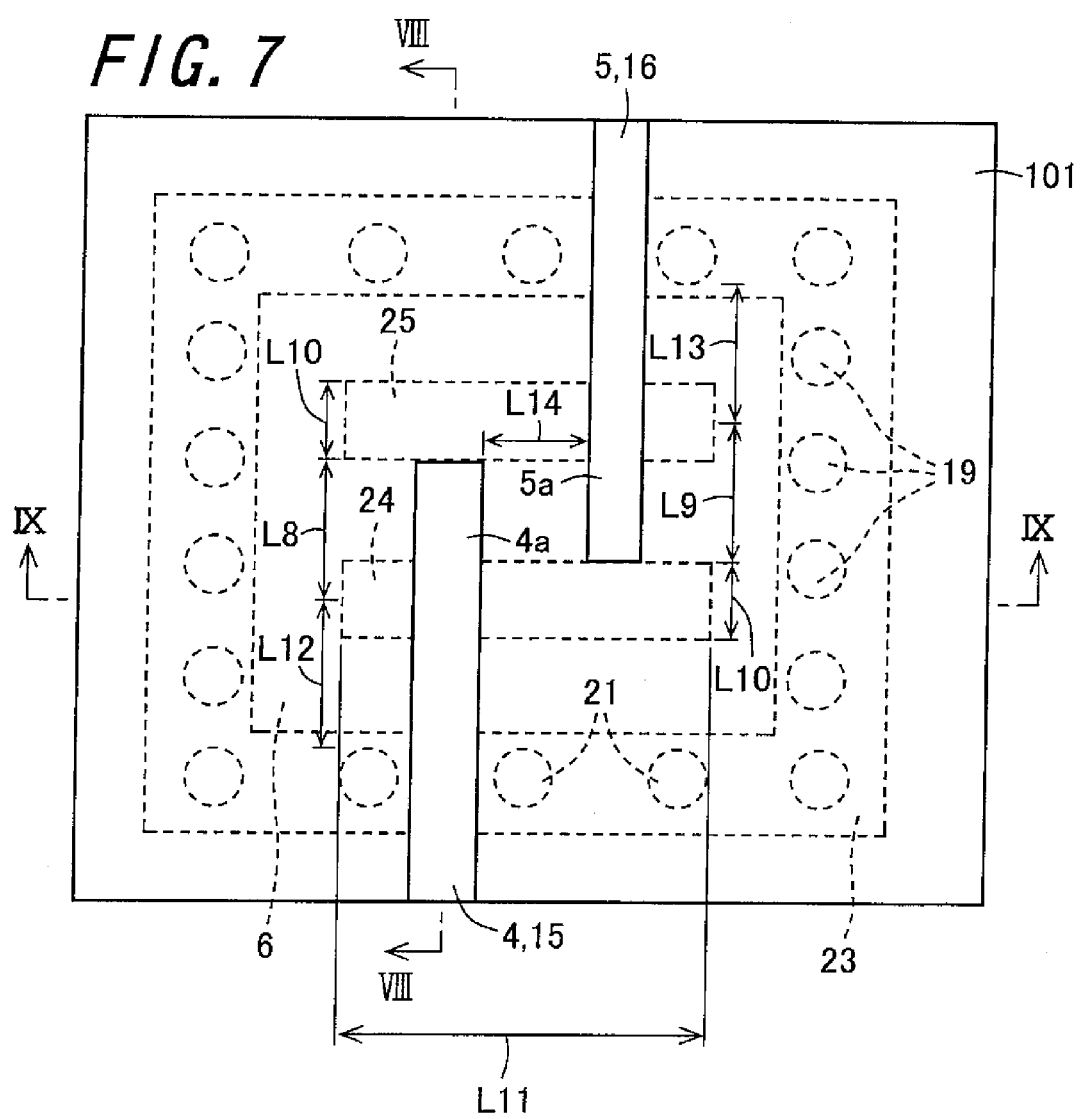
FIG. 7 is a plan view showing the direct-current blocking circuit.
Figure 8:
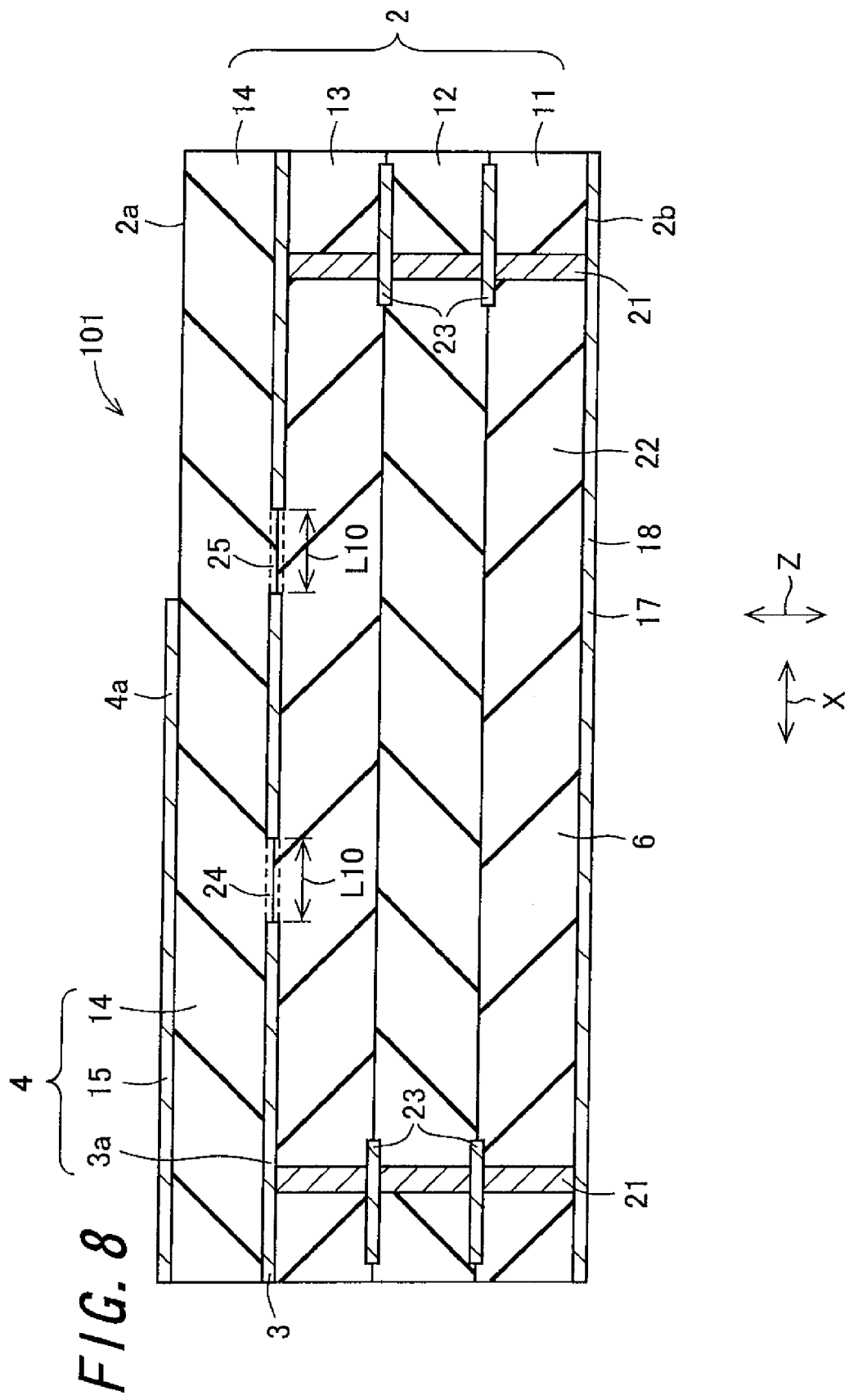
FIG. 8 is a sectional view of the direct-current blocking circuit taken along the line VIII-VIII of FIG. 7.
Figure 9:
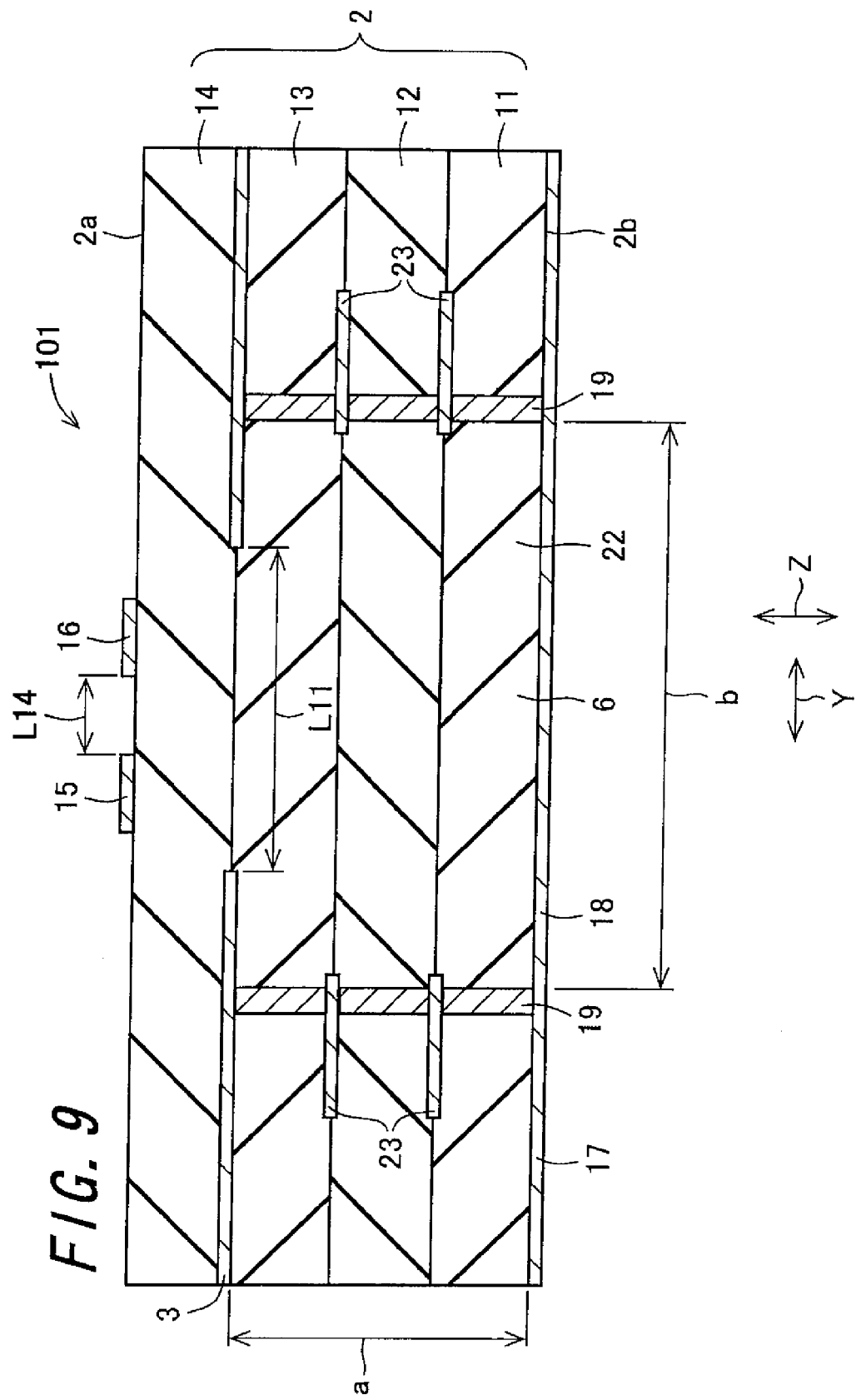
FIG. 9 is a sectional view of the direct-current blocking circuit taken along the line IX-IX of FIG. 7.

FIGS. 6A and 6B are perspective views showing a direct-current blocking circuit 101 in accordance with a third embodiment of the invention. FIG. 6A is a perspective view showing the direct-current blocking circuit 101 as a whole, and FIG. 6*a* is a perspective view of the direct-current blocking circuit 101 sectioned perpendicularly with respect to a transmission direction X in which a radio-frequency signal is transmitted. FIG. 7 is a plan view showing the direct-current blocking circuit 101. FIG. 8 is a sectional view of the direct-current blocking circuit 101 taken along the line VIII-VIII of FIG. 7. FIG. 9 is a sectional view of the direct-current blocking circuit 101 taken along the line IX-IX of FIG. 7. The direct-current blocking circuit 101 of this embodiment is substantially the same in structure as the direct-current blocking circuits 1 and 31 of the above-mentioned embodiments, and therefore the components that play the same or corresponding roles as in the above-mentioned embodiment will be denoted by the same reference symbols, and overlapping descriptions will be omitted occasionally.

In contrast to the above-mentioned embodiments in which the first and second planar lines 4 and 5 are arranged in the form of a rectilinear figure in the transmission direction X, with one end 4*a* of the first planar line 4 and one end 5*b* of the second planar line 5 arranged to be apart from each other in the transmission direction X, in the direct-current blocking circuit 101 of this embodiment, the first and second planar lines 4 and 5 are so arranged that one end 4*a* of the first planar line 4 and one end 5*a* of the second planar line 5 are in spaced parallel relation to each other in a width direction Y which is perpendicular to their extending directions (transmission direction X) and the thickness direction of the dielectric substrate 2 (vertical direction Z). Moreover, one end 4a of the first planar line 4 and one end 5a of the second planar line 5 are so formed as to extend in opposite directions in a face-to-face manner and overlap with each other in the transmission direction X.

The waveguide 6 and the first planar line 4 are electromagnetically coupled to each other in the conductor layer 3 at a location closer to another end of the first planar line 4 than the region where the first and second planar lines 4 and 5 face each other in their extending directions (transmission direction X). On the other hand, the waveguide 6 and the second planar line 5 are electromagnetically coupled to each other in the conductor layer 3 at a location closer to another end of the second planar line 5 than the region where the first and second planar lines 4 and 5 face each other in their extending directions (transmission direction X). In the present embodiment, just like the above-mentioned embodiment, the waveguide 6 and the first planar line 4 are electromagnetically coupled to each other via the first through-hole 24, and the waveguide 6 and the second planar line 5 are electromagnetically coupled to each other via the second through-hole 25. The first and second through-holes 24 and 25 are arranged to be apart from each other in the transmission direction X, and are so formed as to extend in parallel with the width direction Y in a face-to-face manner.

The first strip conductor 15 extends in the transmission direction X so as to cross the first through-hole 24 toward the second through-hole 25, with its one end slightly spaced away from the second through-hole 25 to avoid overlapping between the first strip conductor 15 and the second through-hole 25, when viewed from one side in the vertical direction Z. On the other hand, the second strip conductor 16 extends in the transmission direction X so as to cross the second through-hole 25 toward the first through-hole 24, with its one end slightly spaced away from the first through-hole 24 to avoid overlapping between the second strip conductor 16 and the first through-hole 24, when viewed from one side in the vertical direction Z. That is, the region of confrontation between the first and second planar lines 4 and 5 in the transmission direction X is located between the first through-hole 24 and the second through-hole 25 when viewed from one side in the vertical direction Z. In this way, since the first and second strip conductors 15 and 16 overlap with the first and second through-holes 24 and 25, respectively, when viewed from one side in the vertical direction Z, as has already been described, the first and second planar lines 4 and 5 are electromagnetically coupled to the waveguide 6 via the first and second through-holes 24 and 25, respectively. Note that it is essential only that the first planar line 4 and the waveguide 6 be prevented from undergoing a strong mutual electromagnetic coupling via the second through-hole 25, wherefore one end of the first strip conductor 15 may overlap slightly with the second through-hole 25 when viewed from one side in the vertical direction Z. By the same token, one end of the second strip conductor 16 may overlap slightly with the first through-hole 24 when viewed from one side in the vertical direction Z.

When viewed from one side in the vertical direction Z, a length L8 between the position of the first planar line 4 aligned with the center of the first through-hole 24 in the transmission direction X and one end of the first planar line 4 is so selected as to be $\lambda a/4$, just as is the case with the length L2. Similarly, when viewed from one side in the vertical direction Z, a length L9 between the position of the second planar line 5 aligned with the center of the second through-hole 25 in the transmission direction X and one end of the second planar line 5 is so selected as to be $\lambda a/4$, just as is the case with the length L3.

Moreover, the shape of each of the first and second through-holes 24 and 25 is so selected as to achieve a strong electromagnetic coupling between the waveguide 6 and the first and second planar lines 4 and 5. In the present embodiment, just like the width L5, a width L10 of each of the first and second through-holes 24 and 25 in the width direction Y is so selected as to be $\lambda a/2$, and, just like the width L4, a width L11 thereof in the transmission direction X is so selected as to be $0.1 \times \lambda a$.

Moreover, a length L12 between the center of the first through-hole 24 in the transmission direction X and one end of the waveguide 6 in the transmission direction X and a length L13 between the center of the second through-hole 25 in the transmission direction X and the other end of the waveguide 6 in the transmission direction X are each so selected as to be greater than zero but less than half of $\lambda g$ which is one of the in-waveguide wavelengths. In the present embodiment, the lengths L12 and L13 are each so selected as to be $\lambda g/4$, just as is the case with the lengths L6 and L7. Further, in the present embodiment, a spacing L14 between the first strip conductor 15 and the second strip conductor 16 in the width direction Y is so selected as to be 100 µm, and the thickness a of the waveguide 6 in the vertical direction Z and the width b of the waveguide 6 in the width direction Y are so selected as to be 450 µm and $0.75 \times \lambda g$, respectively.

According to the direct-current blocking circuit 101 of the present embodiment thus far described, the first planar line 4 and the waveguide 6 are electromagnetically coupled to each other via the first through-hole 24, and the second planar line 5 and the waveguide 6 are electromagnetically coupled to each other via the second through-hole 25. Accordingly, for example, a radio-frequency signal traveling through the first planar line 4 passes through the first through-hole 24 to be transmitted to the waveguide 6, and whereafter passes through the second through-hole 25 to be transmitted to the second planar line 5. That is, the waveguide 6 acts as the connection between the first planar line 4 and second planar line 5.

With the predetermined spacing L14 secured between the first planar line 4 and the second planar line 5, a direct current component is unable to travel through the waveguide 6 with the consequence that it is blocked in the direct-current blocking circuit 101 without being transmitted from one of the first and second planar lines 4 and 5 to the other. Moreover, by making proper adjustment to the shapes of the first and second through holes 24 and 25, it is possible to lessen the degree of impedance mismatching at the location of connection between the waveguide 6 and the first and second planar line 4 and 5, and thereby reduce the loss of transmission of an alternate current component from one of the first and second planar lines 4 and 5 to the other via the waveguide 6. This allows the direct-current blocking circuit 1 capable of eliminating direct current component with low transmission loss to be attained. Moreover, where the first and second planar lines 4 and 5 and the waveguide 6 are concerned, in contrast to a direct-current blocking circuit such as an interdigital capacitor and a gap-type capacitor, the transmission characteristics are uninfluenced by a reactance component between the microstrip lines. Therefore, by virtue of the location at which the waveguide 6 and the first and second planar lines 4 and 5 are electromagnetically coupled to each other, namely the first and second through-holes 24 and 25, the positions of input/output ports can be determined independently. This makes it possible to determine input/output positions in conformity with the circuit configuration.

Moreover, the first and second planar lines 4 and 5 are so arranged that their one ends 4a and 5a confront each other. In this construction, as compared with the direct-current blocking circuits 1 and 31 of the above-mentioned embodiments in which one end of the first planar line 4 and one end of the second planar line 5 are arranged to be apart from each other in the transmission direction X, the length of the direct-current blocking circuit 101 in the transmission direction X can be reduced by an amount corresponding to the length of the region of confrontation between the first and second planar lines 4 and 5 in the transmission direction X and an amount corresponding to the length L1 between one end of the first planar line 4 and one end of the second planar line 5 in the transmission direction X. This makes it possible to achieve miniaturization of the direct-current blocking circuit 101.

Fourth Embodiment

Figure 10:
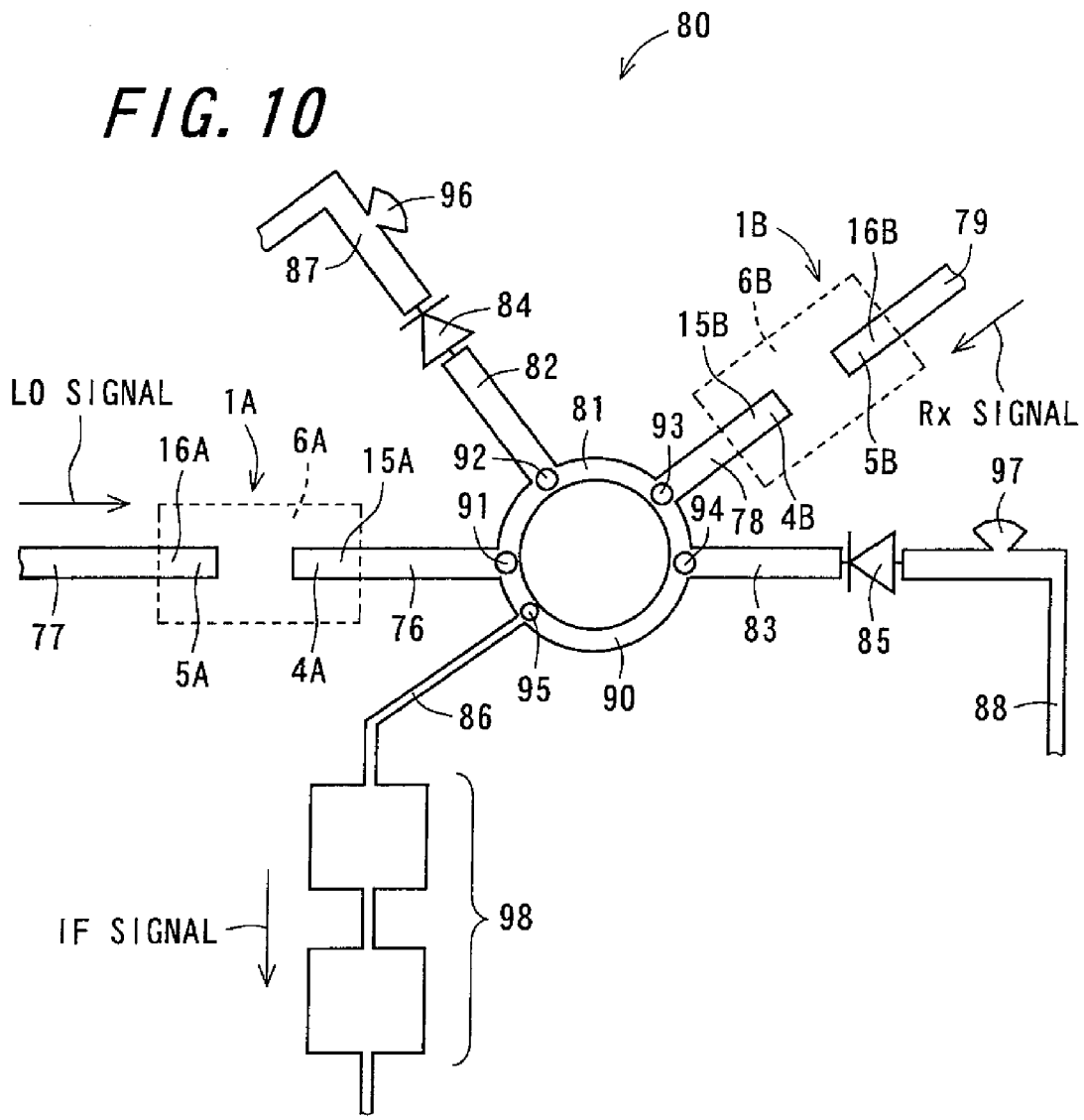
FIG. 10 is a plan view schematically showing a hybrid mixer which is a hybrid circuit device of a fourth embodiment of the invention.

FIG. 10 is a plan view schematically showing a hybrid mixer 80 which is a hybrid circuit device of a fourth embodiment of the invention. The hybrid mixer 80 includes a rat race 81, first to fourth connection lines 76 to 79, the above-mentioned direct-current blocking circuit 1, a first extension 82, a second extension 83, a first detector element 84, a second detector element 85, an output line 86, a first bias supply line 87, and a second bias supply line 88. The rat race 81 is a power divider having a plurality of terminals for dividing electric power supplied from a predetermined one of the terminals and causing the power to be outputted from a different terminal than the predetermined terminal. In this embodiment, there are provided two direct-current blocking circuits 1, of which one is termed "the first direct-current blocking circuit 1A" and the other is termed "the second direct-current blocking circuit 1B". In order to make a distinction between the constituent components, namely the first and second planar lines 4 and 5, the waveguide 6, and the first and second strip conductors 15 and 16, of the first direct-current blocking circuit 1A and those of the second direct-current blocking circuit 1B, a letter "A" is added to the reference symbols indicating the components included in the first direct-current blocking circuit 1A, and a letter "B" is added to the reference symbols indicating the components included in the second direct-current blocking circuit 1B.

The rat race 81 is located on one surface 2a of the dielectric substrate 2. The rat race 81 includes a ring-shaped transmission line 90 and first to fifth terminals 91 to 95 arranged circumferentially of the ring-shaped transmission line 90 in the order named. The perimeter of the ring-shaped transmission line 90 is set at $3(2n-1)\lambda/2$, wherein $\lambda$ represents the wavelength of a radio-frequency signal which is an electromagnetic wave to be inputted, and n represents a natural number. The first to fifth terminals 91 to 95 are terminals for the input and output of electromagnetic waves.

The ring-shaped transmission line 90 is implemented by using a microstrip line and has substantially the shape of a circle, including a circular shape and an elliptic shape. In the present embodiment, the ring-shaped transmission line 90 is circular-shaped. The first to fifth terminals 91 to 95 are arranged circumferentially of the ring-shaped transmission line 90 in the order named. The line length between the first and second terminals 91 and 92, the line length between the second and third terminals 92 and 93, and the line length between the third and fourth terminals 93 and 94 are each so selected as to be $(2n-1)\lambda/4$. The line length between the fourth terminal 94 and the first terminal 91 is so selected as to be $3(2n-1)\lambda/4$. Note that the line length between the terminals is actually twofold, and more specifically, given one line length of x, then the other is $3\lambda/2-x$. In this regard, however, each of the aforementioned line lengths among the terminals is explained as being the shorter one. The line length between the fourth and fifth terminals 94 and 95 is so selected as to be $(2m-1)\lambda/4$ or $(m)\lambda/2$, wherein m represents a natural number, and the following equation: m=n holds true.

The first to fourth connection lines 76 to 79 are formed on one surface 2a of the dielectric substrate 2 to constitute, in conjunction with the dielectric substrate 2, a microstrip line. The first connection line 76 has its one end, in its extending direction, connected to the first terminal 91 and has its another end connected to the first planar line 4A of the first direct-current blocking circuit 1A. The second planar line 5A of the first direct-current blocking circuit 1A is connected to one end of the second connection line 77 in the extending direction. The other end of the second connection line 77 in the extending direction is connected to an electrode (not shown). The electrode connected to the second connection line 77 receives input of a radio-frequency signal having a wavelength of $\lambda_1$, and the radio-frequency signal is then fed through the first direct-current blocking circuit 1A to the first terminal 91.

The third connection line 78 has its one end, in its extending direction, connected to the third terminal 93 and has its another end connected to the first planar line 4B of the second direct-current blocking circuit 1B. The second planar line 5B of the second direct-current blocking circuit 15 is connected to one end of the fourth connection line 79 in the extending direction. Another end of the fourth connection line 79 in the extending direction is connected to an electrode (not shown). The electrode connected to the fourth connection line 79 receives input of a radio-frequency signal having a wavelength of $\lambda_2$, and the radio-frequency signal is then fed through the second direct-current blocking circuit 1B to the third terminal 93. The conductor layer 3 disposed in the dielectric substrate 2 is formed only in that part of the dielectric substrate 2 which is formed with the first direct-current blocking circuit 1A, 1B.

The wavelength $\lambda$ corresponds to each of the wavelengths $\lambda_1$ and $\lambda_2$. Therefore, each of the natural numbers n and m varies according to whether it corresponds to $\lambda_1$ or $\lambda_2$. Even if the natural numbers n and m corresponding to the wavelength $\lambda_1$ are expressed as $n_1$ and $m_1$, respectively, and the natural numbers n and m corresponding to the wavelength $\lambda_2$ are expressed as $n_2$ and $m_2$, respectively, the perimeter of the ring-shaped transmission line 90 and the positions of, respectively, the first to fifth terminals 91 to 95 have to be so selected that the aforementioned relational expressions can be fulfilled in either case.

The first extension 82, which is connected to the second terminal 92, extends outwardly from the second terminal 92. The first detector element 84 is connected to an end of the first extension 82 opposite from the end thereof connected to the second terminal 92 in the extending direction. The first detector element 84 is implemented by using a diode or a Schottky barrier diode. The first detector element 84 has its anode connected to the first extension 82 and has its cathode connected to the first bias supply line 87 for applying voltage to the first detector element 84.

The second extension 83, which is connected to the fourth terminal 94, extends from the fourth terminal 94. The second detector element 85 is connected to an end of the second extension 88 opposite from the end thereof connected to the fourth terminal 94 in the extending direction. The second detector element 85 is implemented by using a diode or a Schottky barrier diode. The second detector element 85 has its cathode connected to the second extension 83 and has its anode connected to the second bias supply line 88 for applying voltage to the second detector element 85.

The first and second extensions 82 and 83 are formed on one surface 2a of the dielectric substrate 2 to constitute, in conjunction with the dielectric substrate 2, a microstrip line. The first and second detector elements 84 and 85 are each implemented by using a diode or a Schottky barrier diode. The first and second detector elements 84 and 85 and the first and second bias supply lines 87 and 88 are formed on one surface 2a of the dielectric substrate 2.

An end of the first bias supply line 87 opposite from the end thereof connected to the first detector element 84 is connected to an electrode (not shown) used for establishing connection between the first bias supply line 87 and an external apparatus on one surface 2a of the dielectric substrate 2. Similarly, an end of the second bias supply line 88 opposite from the end thereof connected to the second detector element 85 is connected to an electrode (not shown) used for establishing connection between the second bias supply line 88 and an external apparatus on one surface 2a of the dielectric substrate 2. The first and second bias supply lines 87 and 88 are formed with fan-shaped radial stubs 96 and 97, respectively. The radial stubs 96 and 97 are provided to prevent leakage of radio-frequency signals. Instead of the radial stubs 96 and 97, a low-pass filter may be disposed in each of the first and second bias supply lines 87 and 88.

The output line 86 is connected to the fifth terminal 95. At an end of the output line 86 opposite from the end thereof connected to the fifth terminal 95 in the extending direction, there is provided an electrode (not shown) for delivering an IF signal out of the apparatus placed on one surface 2a of the dielectric substrate 2. Formed between the electrode and the fifth terminal 95 is a low-pass filter 98 for cutting off radio-frequency signals. The low-pass filter 98 is so formed as to cut off a harmonic signal output from the rat race 81. The low-pass filter 98 includes two quadrangular portions, each of which is obtained by increasing the line width of part of the transmission line in the form of a quadrangle. As another example of the present embodiment, instead of the low-pass filter 98, a radial stub may be disposed in the output line 86.

The first to fourth connection lines 76 to 79, the rat race 81, the first and second extensions 82 and 83, and the first and second bias supply lines 87 and 88 are each primarily made of an electrically conductive metal such as Cu, Ag, W, Mo, Al, Ni, Au, or the like. The first strip conductor 15A of the first direct-current blocking circuit 1A, the first strip conductor 15B of the second direct-current blocking circuit 1B, the rat race 81, and the first and second extensions 82 and 83 are formed integrally with one another.

The electrical length of the first extension 82 and that of the second extension 83 are so selected as to be the same or to differ from each other by an amount corresponding to the length $n\lambda/2$. It is preferable that the electrical lengths of the first and second extensions 82 and 83 are so selected as to be the same from the standpoint of making the apparatus more compact.

The hybrid mixer 80 is used for a receiver, for example, and its role is to produce and put out a signal of intermediate frequency (hereinafter referred to as "IF signal") on the basis of a local signal from an oscillator (hereinafter referred to as "LO signal") and a receiver signal (hereinafter referred to as "Rx signal") which is a signal that the hybrid mixer receives from an external apparatus. A harmonic signal having a wavelength $\lambda_1$ corresponds to the LO signal and a harmonic signal having a wavelength $\lambda_2$ corresponds to the Rx signal. Given that the frequency of a radio-frequency signal having a wavelength $\lambda_1$ is $f_1$ and the frequency of a radio-frequency signal having a wavelength $\lambda_2$ is $f_2$, then an IF signal having a frequency of $k \times f_3$ is outputted from the fifth terminal 95. So long as the following equation: $f_3 = f_1 - f_2$ holds true and two detector elements, namely the first and second detector elements 84 and 85 are provided, k represents a positive odd number. Accordingly, the harmonic signal outputted from the fifth terminal 95 has a frequency of an odd multiple of the fundamental frequency. This helps facilitate the proper design of the low-pass filter 98.

In the hybrid mixer 80, a radio-frequency signal is inputted to the rat race 81 through the first, direct-current blocking circuit 1A and the second direct-current blocking circuit 1B as well. It thus never occurs that a direct current voltage is inputted to the rat race 81. Accordingly, the hybrid mixer 80 can be kept from contact with a direct current component of an input signal. In the hybrid mixer 80, the electrode of the output line 86 is connected to a direct-Current blocking element typified by a ceramic capacitor, so that the rat race 81 and the first and second detector elements 84 and 85 can be kept out of contact with a direct current component. Under this condition the production and output of an intermediate-frequency signal can be achieved.

Moreover, the rat race 81, the first and second direct-current blocking circuits 1A and 1B, the first and second extensions 82 and 83, the first and second detector elements 84 and 65, the output line 86, and the first and second bias supply lines 87 and 88 are integrated on the dielectric substrate 2. This makes the hybrid mixer 80 compact.

The hybrid mixer 80 is fabricated as follows. In the course of the manufacture of the direct-current blocking circuit 1 described previously, a surface of the ceramic green sheet for the first dielectric layer 11 is print-coated with metallized pastes for constituting the first to fourth connection lines 76 to 79, the rat race 81, the first and second extensions 82 and 83, the output line 66, the first and second bias supply lines 87 and 88, and the electrodes connected to the first and second bias supply lines 87 and 88. Following the completion of firing of the ceramic green sheet, the first and second detector elements 84 and 85 are mounted thereon. In this way, the hybrid mixer 80 can be constructed through application of metallized pastes on the ceramic green sheet. As compared with the case of forming the first to fourth connection lines 76 to 79, the rat race 81, the first and second extensions 82 and 83, the output line 86, the first and second bias supply lines 87 and 88, and the electrodes connected to the first and second bias supply lines 87 and 88 by means of vapor deposition, the manufacturing process can be simplified with consequent productivity improvement.

Fifth Embodiment

Figure 11:
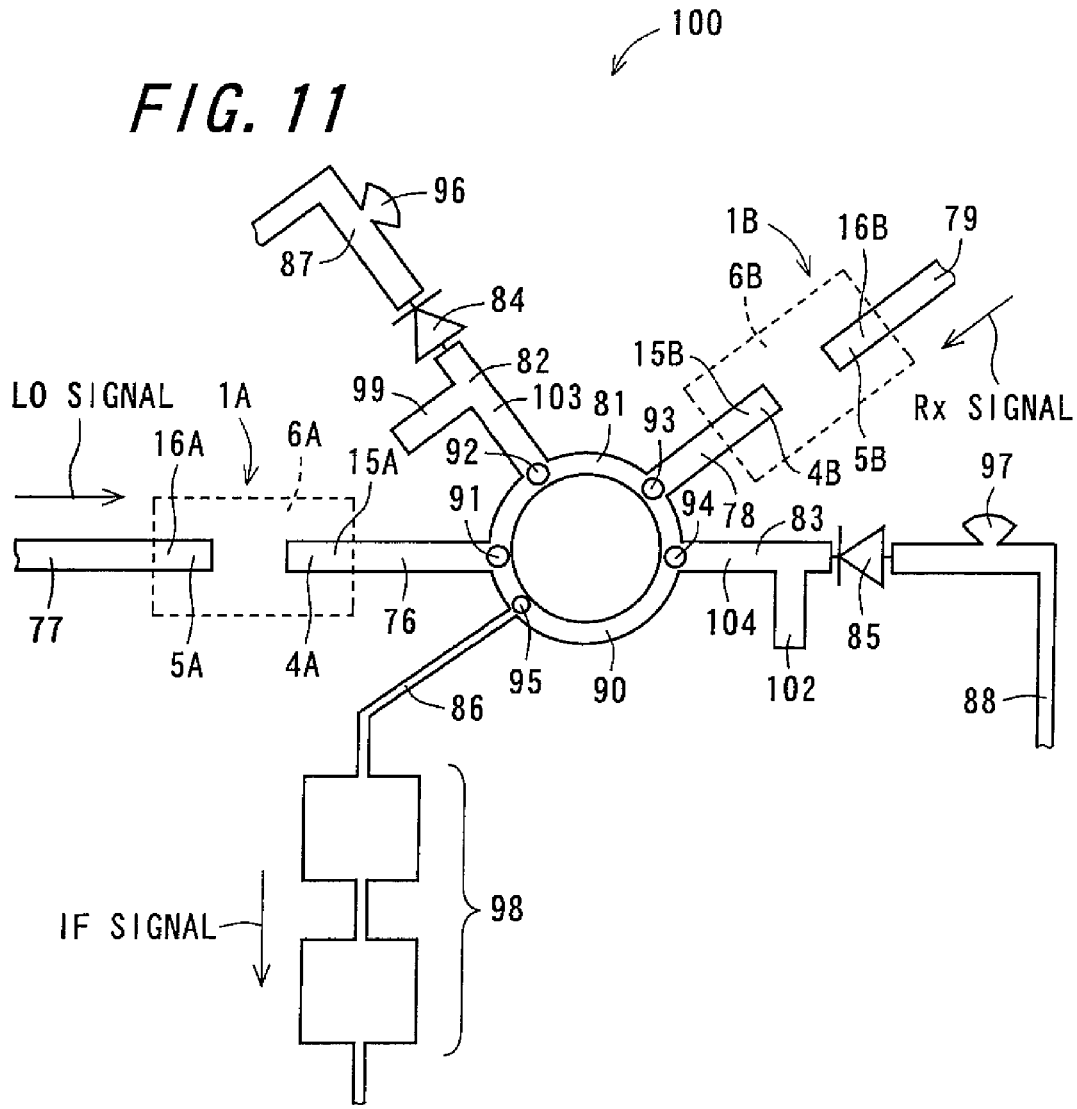
FIG. 11 is a plan view schematically showing a hybrid mixer which is a hybrid circuit device of a fifth embodiment of the invention.

FIG. 11 is a plan view schematically showing a hybrid mixer 100 which is a hybrid circuit device of a fifth embodiment of the invention. The hybrid mixer 100 is similar in structure to the above-mentioned hybrid mixer 80 shown in FIG. 10, and more specifically the hybrid mixer 100 is obtained by adding first and second matching circuits 99 and 102 to the hybrid mixer 80. Therefore, the components that play the same or corresponding roles as in the hybrid mixer 80 will be denoted by the same reference symbols, and overlapping descriptions will be omitted.

The first extension 82 includes a transmission line 103 connected to the second terminal 92 so as to extend therefrom and the first matching circuit 99. The first detector element 84 is connected to an end of the transmission line 103 opposite from the end thereof connected to the second terminal 92. The second extension 83 includes a transmission line 104 connected to the fourth terminal 94 so as to extend therefrom and the second matching circuit 102. The second detector element 85 is connected to an end of the transmission line 104 opposite from the end thereof connected to the fourth terminal 94.

The first and second matching circuits 99 and 102 are each designed as an open stub and provided to adjust the electrical lengths of the first and second extensions 82 and 83. With the provision of the first and second patching circuits 99 and 102, even after the fabrication of the hybrid mixer 80, the electrical lengths of the first and second extensions 82 and 83 can be controlled by making adjustment to the line lengths of the first and second matching circuits 99 and 102. This makes it possible to suppress characteristic variation occurring in the manufacturing operation and thereby achieve enhancement in apparatus reliability and in yield.

Sixth Embodiment

Figure 12:
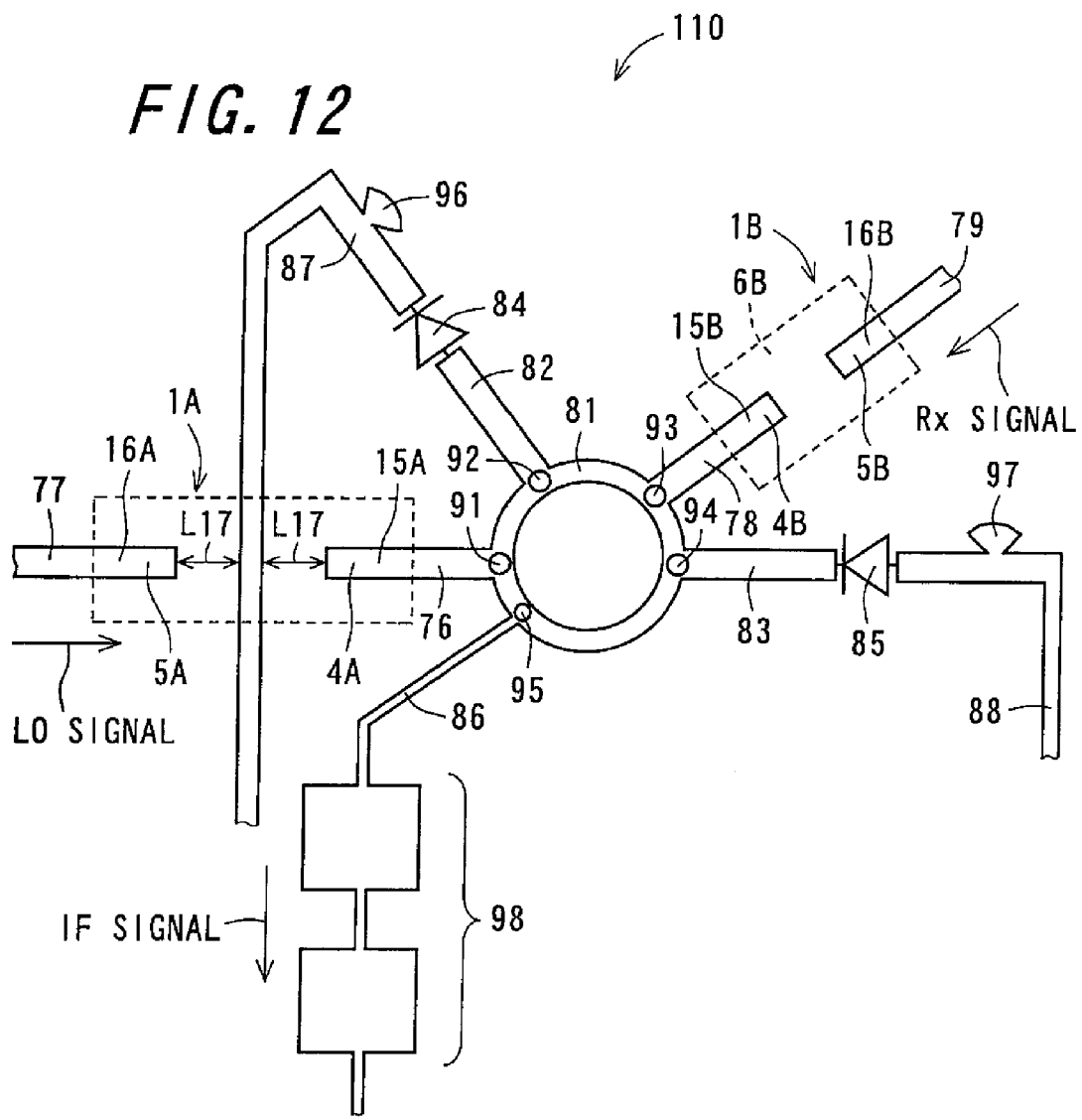
FIG. 12 is a plan view schematically showing a hybrid mixer which is a hybrid circuit device of a sixth embodiment of the invention.

FIG. 12 is a plan view schematically showing a hybrid mixer 110 which is a hybrid circuit device of, a sixth embodiment of the invention. The hybrid mixer 110 is similar in structure to the above-mentioned hybrid mixer 80 shown in FIG. 10, and therefore, the components that play the same or corresponding roles as in the hybrid mixer 80 will be denoted by the same reference symbols, and overlapping descriptions will be omitted.

In this embodiment, the first bias supply line 87 is so formed as to cross the region between the first and second planar lines 4A and 5B of the first direct-current blocking circuit 1A. In other words, the first bias supply line 87 is so formed as to cross the region between the first strip conductor 15A and the second strip conductor 16A. In this way, by routing the first bias supply line 87 so as to cross the region between the first strip conductor 15A and the second strip conductor 16A on one surface 2a of the dielectric substrate 2, it is possible to increase the degree of placement freedom for an electrode (not shown) for applying voltage to the first bias supply line 87. For example, in a case of forming the electrode for applying voltage to the first bias supply line 87 together with an electrode for inputting a LO signal and a Rx signal to the hybrid mixer 80, an electrode for applying voltage to the second bias supply line 88, and an electrode for outputting an IF signal in a highly dense arrangement, the path length of the first bias supply line 87 can be made as short as possible. Thus, in the present embodiment, it is possible to achieve the same effects as achieved in the above-mentioned embodiments, as well as to increase the degree of design flexibility in terms of the position of the electrode of the first bias supply line 87.

In the region between the first strip conductor 15A and the second strip conductor 16A, a distance L17 between the second bias supply line 88 and the first and second strip conductors 15A and 16A is so selected as to be greater than or equal to half of the wavelength of the radio-frequency signal transmitted to the first and second strip conductors 15A and 16A.

In another example of the present embodiment, the first bias supply line 87 may be so formed as to cross the region between the first strip conductor 15B and the second strip conductor 16B, or the second bias supply line 88 may be so formed as to cross the region between the first strip conductor 15B and the second strip conductor 16B.

Seventh Embodiment

Figure 13:
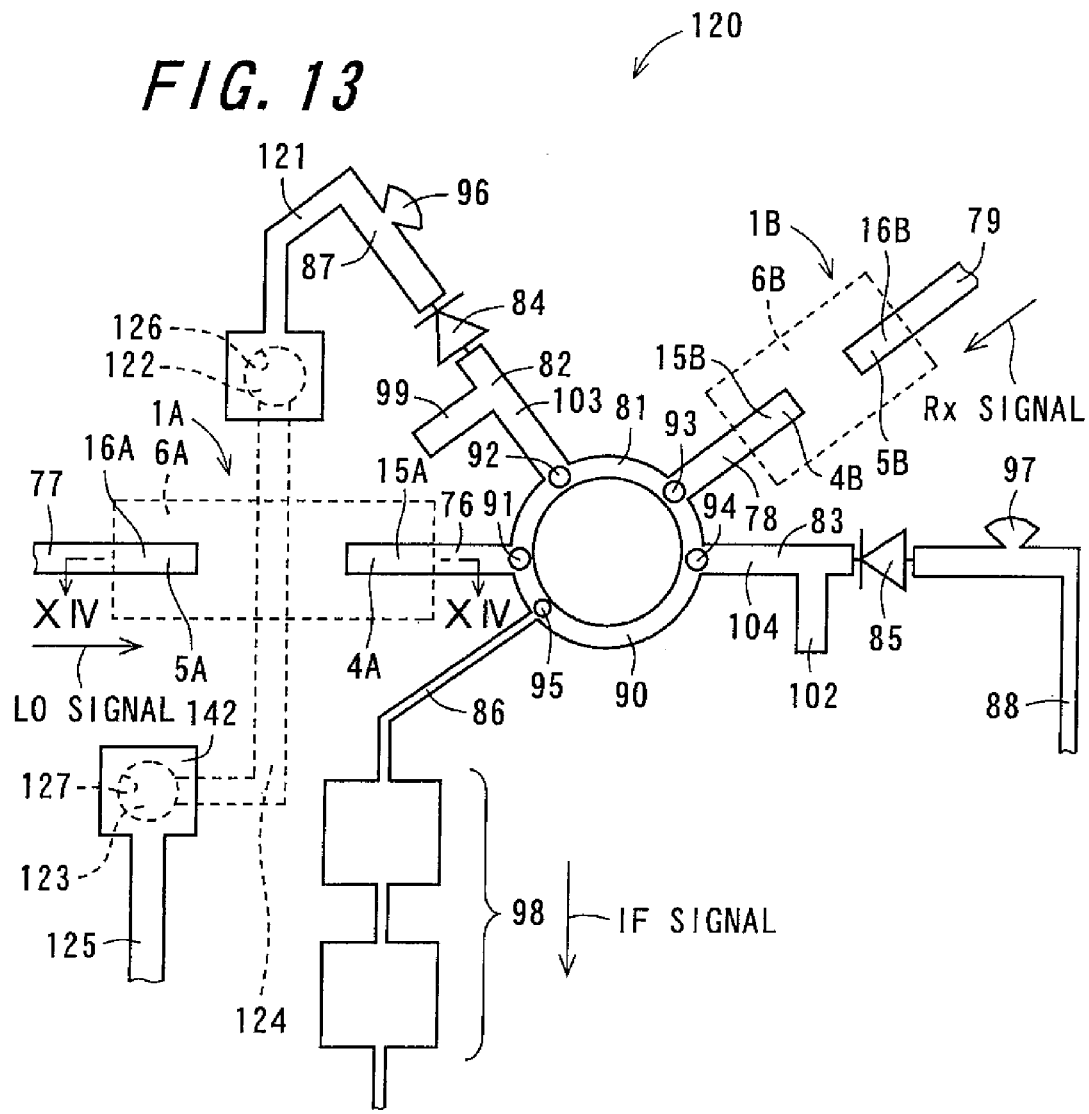
FIG. 13 is a plan view schematically showing a hybrid mixer which is a hybrid circuit device of a seventh embodiment of the invention.
Figure 14:
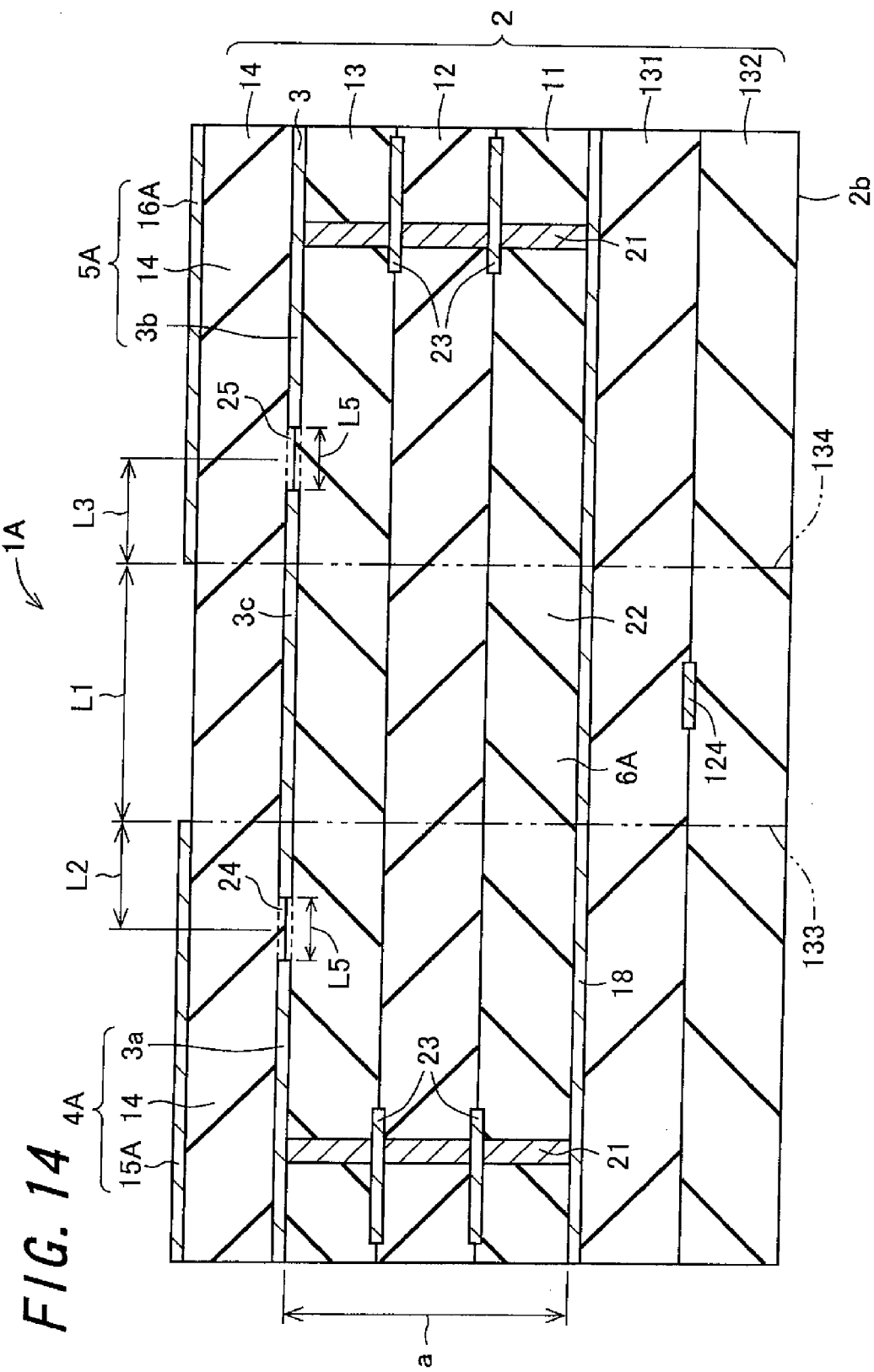
FIG. 14 is a sectional view taken along the line XIV-XIV of FIG. 13.

FIG. 13 is a plan view schematically showing a hybrid mixer 120 which is a hybrid circuit device of a seventh embodiment, of the invention. FIG. 14 is a sectional view of a part thereof taken along the line XIV-XIV of FIG. 13. The hybrid mixer 120 is similar in structure to the above-mentioned hybrid mixer 100 shown in FIG. 11, and therefore the components that play the same or corresponding roles as in the hybrid mixer 100 will be denoted by the same reference symbols, and overlapping descriptions will be omitted.

In this embodiment, the dielectric substrate 2 includes, in addition to the first to fourth dielectric layers 11 to 14, a fifth dielectric layer 131 and a sixth dielectric layer 132. The fifth dielectric layer 131 is laminated on the other surface of the bottom conductor layer 18 in the thickness direction. The sixth dielectric layer 132 is laminated on the other surface of the fifth dielectric layer 131 in the thickness direction. Thus, in the present embodiment, the other surface of the sixth dielectric layer 132 in the thickness direction coincides with the other surface 2b of the dielectric substrate 2. The bottom conductor layer 18 is embedded in the dielectric substrate 2.

Moreover, in the present embodiment, the first bias supply line 67 includes a first superficial-layer wiring portion 121 connected to the first detector element 84 on one surface 2a of the dielectric substrate 2; first and second vias 122 and 123; an internal-layer wiring portion 124 formed in the interior of the dielectric substrate 2; and a second superficial-layer wiring portion 125 formed on one surface 2a of the dielectric substrate 2.

The dielectric substrate 2 is formed with via holes 126 and 127 extending in the thickness direction. The via holes 126 and 127 are so formed as to pass completely through the first to fifth dielectric layers 11 to 14 and 131 for provision of the first and second vies 122 and 123, respectively. At an end of the first superficial-layer wiring portion 121 opposite from the end thereof connected to the first detector element 84 in the extending direction, there is formed a first via connecting portion 141 which is connected to the first via 122. The first via 122 is connected to one end of the internal-layer wiring portion 124 in the extending direction. Another end of the internal-layer wiring portion 124 in the extending direction is connected to the second via 123. The internal-layer wiring portion 124, which is embedded between the fifth and sixth dielectric layers 181 and 132, is so disposed as to pass along one side of the waveguide 6 toward the other surface 2b of the dielectric substrate 2.

Moreover, that part of the internal-layer wiring portion 124 which overlaps with the waveguide 6A through the fifth dielectric layer 131 is located in a region between a first virtual plane 133 which includes an end face of the first strip conductor 15A opposed to the second strip conductor 16A and extends in parallel with the thickness direction and a second virtual plane 134 which includes an end face of the second strip conductor 16A opposed to the first strip conductor 15A and extends in parallel with the thickness direction. With such a placement of the internal-layer wiring portion 124, since the waveguide 6A is connected to ground, even if a bias voltage is applied to the first bias supply line 87, it never occurs that a parasitic capacitance arises between the first and second strip conductors 15A and 16A. This makes it possible to achieve transmission of a radio-frequency signal through the first and second strip conductors 15A and 16A and the waveguide 6A without any adverse effect.

The second via 123 is connected to a second via connecting portion 142 formed at one end of the second superficial-layer wiring portion 125 in the extending direction. Another end of the second superficial-layer wiring portion 125 in the extending direction is connected to an electrode (not shown) for applying voltage to the first bias supply line 87. Also in the hybrid mixer 120 thereby constructed, just like the above-mentioned hybrid mixer 110, it is possible to increase the degree of placement freedom for the electrode (not shown) for applying voltage to the first bias supply line 8, as well as to increase the degree of design flexibility in terms of the position of the electrode of the first bias supply line 87.

In another example of the present embodiment, the first bias supply line 87 may be so formed as to cross the region between the first strip conductor 15B and the second strip conductor 16B, or the second bias supply line 88 may be so formed as to cross the region between the first strip conductor 15B and the second strip conductor 16B.

While, in the present embodiment, the first bias supply line 87 is so formed as to run between the waveguide 6A and the other surface 2b of the dielectric substrate 2, in still another example of the present embodiment, the first bias supply line 87 or the second bias supply line 88 may be so formed as to run between the waveguide 6B and the other surface 2b of the dielectric substrate 2.

Moreover, while the hybrid mixers 80, 110, and 120 of the embodiments thus far described employ the direct-current blocking circuit 1, any of the direct-current blocking circuits 31 and 101 may be employed in lieu of the direct-current blocking circuit 1. Meanwhile, in a case of inputting a radio-frequency signal to the hybrid mixers 80, 110, and 120 from a semiconductor apparatus such as an amplifier, there is a need to provide the direct-current blocking circuits 1, 31, and 101. On the other hand, in a case of inputting a radio-frequency signal thereto from a non-semiconductor apparatus such as an antenna, there is no need to provide the direct-current blocking circuits 1, 31, and 101. For example, in a case where the fourth connection line 79 is connected directly or via a divider to an antenna, the second direct-current blocking circuit 1B does not necessarily have to be provided. With the provision of the first direct-current blocking circuit 1A alone, it is possible to achieve a similar desired effect.

Eighth Embodiment

Figure 15:
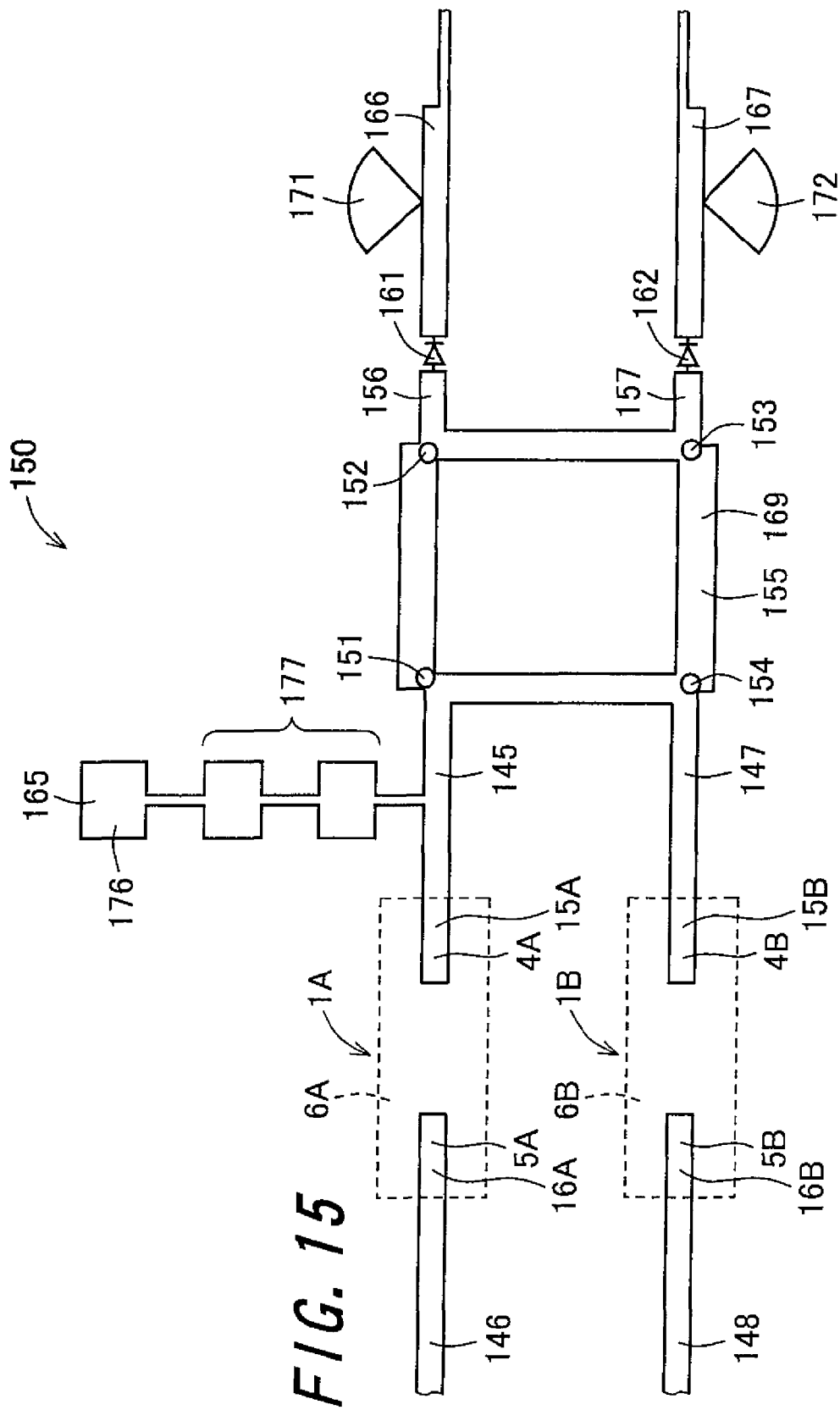
FIG. 15 is a diagram schematically showing the structure of a phase-shift circuit device which is a hybrid circuit device of an eighth embodiment of the invention.

FIG. 15 is a diagram schematically showing the structure of a phase-shift circuit device 150 which is a hybrid circuit device of an eighth embodiment of the invention. The components of this embodiment that play the same or corresponding roles as in the above-mentioned embodiments will be denoted by the same reference symbols, and overlapping descriptions will be omitted.

The phase-shift circuit device 150 includes a branch line 155, first to fifth connection lines 145 to 149, the first and second direct-current blocking circuits 1A and 1B, first and second extensions 156 and 157, first and second variable capacitance elements 161 and 162, a reference electrode 165, and first and second bias supply lines 166 and 167. The branch line 155 is a power divider having first to fourth terminals 151 to 154. The branch line 155, the first to fourth connection lines 145 to 148, the first and second extensions 156 and 157, the first and second variable capacitance elements 161 and 162, the reference electrode 165, and the first and second bias supply lines 166 and 167 are formed on one surface of the dielectric substrate 2. The first and second variable capacitance elements 161 and 162 are each implemented by using a semiconductor element such as a varactor diode, a ferroelectric element, a piezoelectric element, a voltage-controlled variable capacitor including MEMS (Micro. Electro Mechanical Systems) element, or the like.

The branch line 155 includes a quadrangular transmission line 169 having a perimeter of $(2n-1)\lambda$, wherein $\lambda$ represents the wavelength of an electromagnetic wave, namely a radio-frequency signal supplied from the first terminal 151. The quadrangular transmission line 169 constitutes, in conjunction with the dielectric substrate 2, a microstrip line, and has a quadrangular shape or substantially the shape of a square with rounded sides. In this embodiment, the quadrangular transmission line 169 is quadrangular-shaped. The first to fourth terminals 151 to 154 are arranged circumferentially of the quadrangular transmission line 169 in the order named. The line length between the adjacent output, terminals is so selected as to be $(2n-1)\lambda/4$. In the present embodiment, the symbol "n" takes on a numeric value of 1. Given that the characteristic impedance of the transmission line between the first terminal 151 and the second terminal 152 is Z1; the characteristic impedance of the transmission line between the second terminal 152 and the third terminal 153 is Z2; the characteristic impedance of the transmission line between the third terminal 153 and the fourth terminal 154 is Z3; and the characteristic impedance of the transmission line between the fourth terminal 154 and the first terminal 151 is Z4, then the quadrangular transmission line 169 is so designed that the relationship among Z1, Z2, Z3, and Z4 fulfills the following equation (1).

[Equation 1]

$$\sqrt{2}Z1 = Z2 = \sqrt{2}Z3 = Z4 \quad (1)$$

In the branch line 155 thereby constructed, upon input of a radio-frequency signal having a wavelength $\lambda$ from the first terminal 151, the inputted radio-frequency signal is divided between the second terminal 152 and the third terminal 153, and the terminals produce radio-frequency signal output. However, the fourth terminal 154 is not responsible for the output. Moreover, the radio-frequency signal outputted from the second terminal 152 and the radio-frequency signal outputted from the third terminal 153 differ in phase by $\pi/2$ (rad) from each other.

The first connection line 145 has its one end, in its extending direction, connected to the first terminal 151 and has its another end connected to the first planar line 4A of the first direct-current blocking circuit 1A. The second planar line 5A of the first direct-current blocking circuit 1A is connected to one end of the second connection line 146 in the extending direction. Another end of the second connection line 146 in the extending direction is connected to an electrode (not shown). The electrode connected to the second connection line 146 receives input of a radio-frequency signal having a wavelength of $\lambda$, and the radio-frequency signal is then fed through the first direct-current blocking circuit 1A to the first terminal 151.

Moreover, the third connection line 147 has its one end, in its extending direction, connected to the fourth terminal 154 and has its another end connected to the first planar line 4B of the second direct-current blocking circuit 1B. The second planar line 5B of the second direct-current blocking circuit 1B is connected to one end of the fourth connection line 148 in the extending direction. Another end of the fourth connection line 148 in the extending direction is connected to an electrode (not shown). The conductor layer 3 disposed in the dielectric substrate 2 is formed only in that part of the dielectric substrate 2 which is formed with the first direct-current blocking circuit 1A, 1B.

The first extension 156 is connected to the second terminal 152. The first variable capacitance element 161 is connected to an end of the first extension 156 opposite from the end thereof connected to the second terminal 152. In the present embodiment, the first variable capacitance element 161 (the second variable capacitance element 162 as well) is implemented by using a varactor diode, the anode of which is connected to the first extension 156 and the cathode of which is connected to the first bias supply line 166 for applying voltage to the first variable capacitance element 161.

The second extension 157 is connected to the third terminal 153. The second variable capacitance element 162 is connected to an end of the second extension 156 opposite from the end thereof connected to the third terminal 153. In the present embodiment, the second variable capacitance element 162 is implemented by using a varactor diode, the anode of which is connected to the second extension 157 and the cathode of which is connected to the second bias supply line 167 for applying voltage to the second variable capacitance element 162.

An end of the first bias supply line 166 opposite from the end thereof connected to the first variable capacitance element 161 is connected to an electrode (not shown) used for establishing connection between the first bias supply line 166 and an external apparatus on one surface 2a of the dielectric substrate 2. Similarly, an end of the second bias supply line 167 opposite from the end thereof connected to the second variable capacitance element 162 is connected to an electrode (not shown) used for establishing connection between the second bias supply line 167 and an external apparatus on one surface 2a of the dielectric substrate 2. The first and second bias supply lines 166 and 167 are formed with fan-shaped radial stubs 171 and 172, respectively. The radial stubs 171 and 172 are provided to prevent leakage of radio-frequency signals. Instead of the radial stubs 171 and 172, a low-pass filter may be disposed in each of the first and second bias supply lines 166 and 167.

The reference electrode 165, which is provided to determine a reference voltage as to a voltage to be applied to the first and second variable capacitance elements 161 and 162, is so formed as to branch off of a part of the first connection line 145 lying at a position midway between the first direct-current blocking circuit 1A and the first terminal 151. At the end of the reference electrode 165 is formed an electrode pad 176. Formed between the electrode pad 176 and the first connection line 145 is a low-pass filter 38 for cutting off radio-frequency signals.

The first extension 156 is designed to act as a stub for reflecting the radio-frequency signal supplied from the second terminal 152 through the first terminal 151. Moreover, the second extension 157 is designed to act as a stub for reflecting the radio-frequency signal supplied from the third terminal 153 through the first terminal 151.

The line length of the first extension 156 and the line length of the second extension 157 are so selected as to be substantially the same or to differ from each other by an amount corresponding to the length $n\lambda/2$. In this way, the radio-frequency signal reflected from the first extension 27 and the radio-frequency signal reflected from the second extension 28, which are merged in the fourth terminal 154, become equal in phase, and the radio-frequency signal supplied from the first terminal 151 is outputted from the fourth terminal 154. With use of the phase-shift circuit device 150 thereby constructed, even if the first and second variable capacitance elements 161 and 162 that cause phase variation in a reflected wave are adopted, the electromagnetic wave supplied from the first terminal 151 can be outputted from the fourth terminal 154.

The impedance of the first and second extensions 156 and 157 varies according to the voltage applied to the first and second bias supply lines 166 and 167. Accordingly, by making adjustment to the voltage applied to the first and second bias supply lines 166 and 167, it is possible to control the amount of phase variation in the radio-frequency signal passing through the phase-shift circuit device 150.

In the phase-shift circuit device 150 thus far described, since a radio-frequency signal is inputted to the branch line 155 via the first direct-current blocking circuit 1A, direct current voltage is then inhibited from being inputted to the branch line 155. Accordingly, the branch line 155 can be kept from contact with a direct current component of an input signal, wherefore the first and second variable capacitance elements 161 and 162 are free from application of direct current voltage entailed by radio-frequency signal input. This enables the branch line 155 to distribute electric power with high accuracy, that is, phase variation can be caused with high accuracy. Moreover, with the placement of the second direct-current blocking circuit 1B at its output line, the branch line 155 can be kept from contact with a direct current component from, for example, a signal processing circuit located downstream thereof with the consequence that phase adjustment can be achieved more accurately. Further, while the phase shift circuit device 150 employs the direct-current blocking circuit 1, any of the direct-current blocking circuits 31 and 101 may be employed in lieu of the direct-current blocking circuit 1.

The hybrid circuit device thus fax described is constructed of a combination of the above-mentioned direct-current blocking circuit and the rat race or the branch line acting as a power divider. In another embodiment of the invention, the power divider to be connected to the direct-current blocking circuit may be implemented by using a directional coupler, a Magic T coupler, or a circulator. In this case, at least one of the input section and the output section of the directional coupler, Magic T coupler, or circulator is connected to the direct-current blocking circuit. By doing so, the power divider can be kept out of contact with a direct current component, with consequent highly accurate power distribution.

Ninth Embodiment

Figure 16:
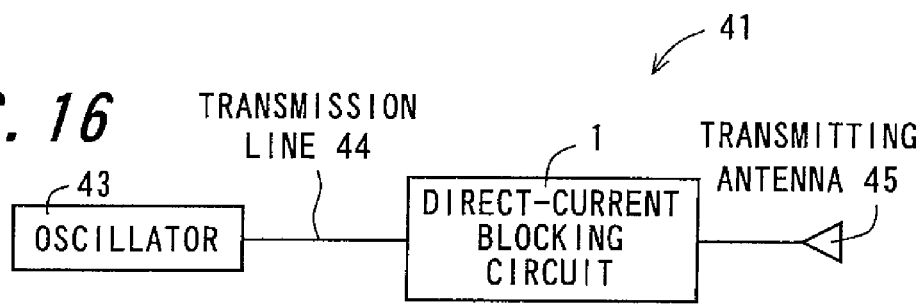
FIG. 16 is a schematic diagram showing the configuration of a transmitter of a ninth embodiment of the invention.

FIG. 16 is a schematic diagram showing the configuration of a transmitter 41 of a ninth embodiment of the invention. The transmitter 41 includes a radio-frequency oscillator 43 for generating radio-frequency signals; a transmission line 44 connected to the radio-frequency oscillator 43, for transmitting radio-frequency signals from the radio-frequency oscillator 43; the direct-current blocking circuit 1 of the above-mentioned embodiment as shown in FIG. 1 that is inserted in the transmission line 44 to allow passage of radio-frequency signals through the waveguide 6; and a transmitting antenna 45 connected to the transmission line 44, for radiating radio-frequency signals. While the transmitter 41 of this embodiment employs the direct-current blocking circuit 1 shown in FIG. 1, there is no particular limitation and any one of the direct-current blocking circuits of the above-mentioned embodiments may be employed instead.

The radio-frequency oscillator 43 includes a Gunn, oscillator utilizing a Gunn diode, an IMPATT oscillator utilizing an IMPATT diode, or MMIC which functions as an oscillator utilizing a transistor such as FET (Field Effect Transistor), and its role is to produce radio-frequency signals. For example, the radio-frequency oscillator 43 is mounted on an electronic component mount placed on the same substrate as that formed with the direct-current blocking circuit 1, namely the dielectric substrate 2. In the following description, by definition, the dielectric substrate 2 is not limited to the part thereof formed with the direct-current blocking circuit 1, and it refers to the entire substrate constituting circuitry with inclusion of the radio-frequency oscillator 43 mounted thereon.

For example, the transmission line 44 is implemented by using a planar line such as a strip line, a microstrip line, a slot line, and a coplanar line, as well as bonding wire and the like. The planar line constituting the transmission line 44 is formed on the dielectric substrate 2, for example. In the present embodiment, the connection between the radio-frequency oscillator 43 and the planar line is established by means of a bonding wire, for example.

The direct-current blocking circuit 1 is inserted in the transmission line 44. Specifically, the first planar line 4 is connected to a part of the transmission line 44 which is located toward the radio-frequency oscillator 43 with respect to the direct-current blocking circuit 1, and the second planar line 5 is connected to a part of the transmission line 44 which is located toward the transmitting antenna 45 with respect to the direct-current blocking circuit 1. In a case where the planar line constituting the transmission line 44 is the same in type as the first and second planar lines 4 and 5, the transmission line 44 is formed integrally with the first and second planar lines 4 and 5. By inserting the direct-current blocking circuit 1 in that way, it is possible to allow the radio-frequency signal produced by the radio-frequency oscillator 43 to travel through the waveguide 6.

The transmitting antenna 45 is implemented by using a horn antenna, a slot antenna, or the like. The transmitting antenna 45 may be either formed on or attached to the dielectric substrate 2.

The radio-frequency signal produced by the radio-frequency oscillator 43 propagates through the transmission line 44 and the direct-current blocking circuit 1, is fed to the transmitting antenna 45, and is then emitted therefrom as a radio wave.

In the transmitter 41 of the present embodiment thus far described, the direct-current blocking circuit 1 is inserted in the transmission line 44 providing connection between the oscillator and the transmitting antenna 45. As has already been described, the direct-current blocking circuit 1 is capable of blocking direct current voltage. Accordingly, even if a direct current voltage is applied to a part of the transmission line 44 which is located toward the transmitting antenna 45 with respect to the direct-current blocking circuit 1, the direct current voltage is blocked by the direct-current blocking circuit 1 with the consequence that the radio-frequency oscillator 43 is free from direct current transmission. It thus never occurs that undesired voltage is applied to the radio-frequency oscillator 43, wherefore the radio-frequency oscillator 43 can be protected against quality degradation and malfunction. This allows the transmitter 41 capable of producing radio-frequency signals with stable magnitude to be attained.

Tenth Embodiment

Figure 17:
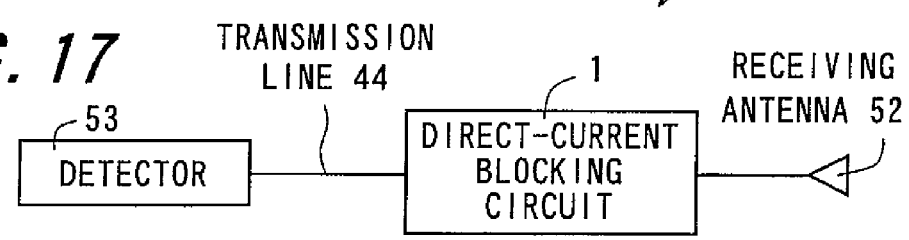
FIG. 17 is a schematic diagram showing the configuration of a receiver of a tenth embodiment of the invention.

FIG. 17 is a schematic diagram showing the configuration of a receiver 51 of a tenth embodiment of the invention. The receiver 51 includes a receiving antenna 52 for acquiring radio-frequency signals; a transmission line 44 connected to the receiving antenna 52, for transmitting the radio-frequency signal acquired by the receiving antenna 52; the direct-current blocking circuit 1 of the above-mentioned embodiment as shown in FIG. 1 that is inserted in the transmission line 44 to allow passage of radio-frequency signals through the waveguide 6; and a radio-frequency detector 53 connected to the transmission line 44, for detecting the radio-frequency signal transmitted to the transmission line 44. While the receiver 51 of this embodiment employs the direct-current blocking circuit 1 shown in FIG. 1, there is no particular limitation and any one of the direct-current blocking circuits of the above-mentioned embodiments may be employed instead. The receiver 51 of this embodiment is constructed by making some modification to the above-mentioned transmitter 41, and more specifically the radio-frequency detector 53 replaces the radiofrequency oscillator 43, and the receiving antenna 52 replaces the transmitting antenna 45. Note that the transmitting antenna 45 and the receiving antenna 52 areas different as the names thereof, but they may be constructed of antennas of the same structure.

The radio-frequency, signal acquired by the receiving antenna 52 propagates through the transmission line 44 and the direct-current blocking circuit 1 and is then detected by the radio-frequency detector 53.

In the receiver 51 of the present embodiment thus far described, the direct-current blocking circuit 1 is inserted in the transmission line 44 providing connection between the radio-frequency detector 53 and the receiving antenna 52. As has already been described, the direct-current blocking circuit 1 is capable of blocking direct current voltage. Accordingly, even if a direct-current voltage is applied to that part of the transmission line 44 which is located toward the receiving antenna 52 with respect to the direct-current blocking circuit 1, the direct current voltage is blocked by the direct-current blocking circuit 1 with the consequence that the radio-frequency detector 53 is free from direct current transmission. It thus never occurs that undesired voltage is applied to the radio-frequency detector 53, wherefore the radio-frequency detector 53 can be protected against quality degradation and malfunction. This allows the receiver 51 having stable detection capability to be attained.

Eleventh Embodiment

Figure 18:
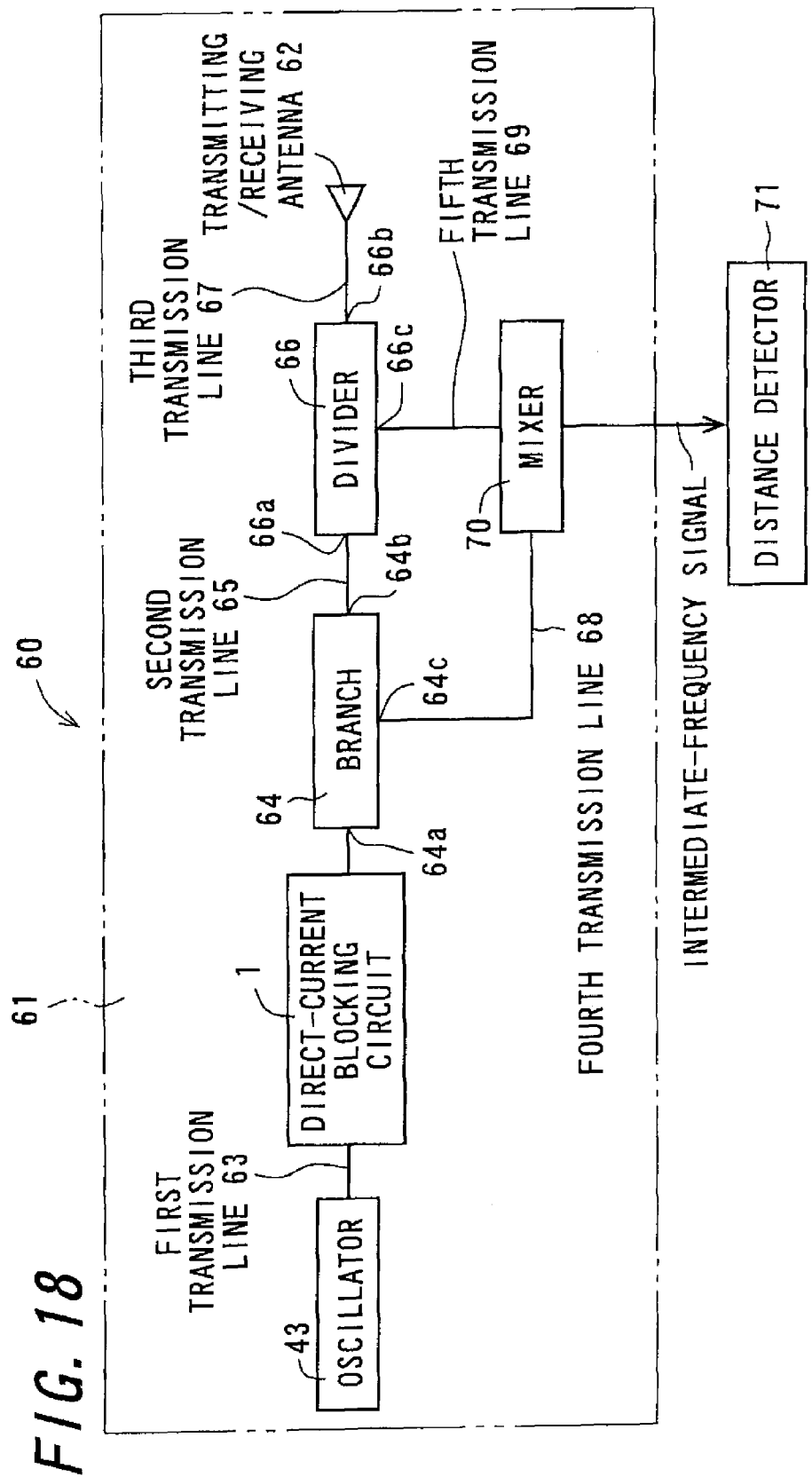
FIG. 18 is a schematic diagram showing the configuration of a radar device of an eleventh embodiment of the invention.

FIG. 18 is a schematic diagram showing the configuration of a radar device 60 of an eleventh embodiment of the invention. The radar device 60 includes a transmitter-receiver 61 and a distance detector 71 for detecting a distance from the transmitter-receiver 61 to an object to be detected on the basis of an intermediate-frequency signal from the transmitter-receiver 61.

The transmitter-receiver 61 includes the above-mentioned radio-frequency oscillator 43 for generating radio-frequency signals; a first transmission line 63; a branch 64; a second transmission line 65; a divider 66; a third transmission line 67; a transmitting/receiving antenna 62; a fourth transmission line 68; a fifth transmission line 69; a mixer 70; and the above-mentioned direct-current blocking circuit 1 shown in FIG. 1. The first transmission line 63 is connected to the radio-frequency oscillator 43, and transmits radio-frequency signals. The branch 64 has a first terminal 64e, a second terminal 64b, and a third terminal 64c, of which the first terminal 64a is connected to the first transmission line 63. In the branch 64, the radio-frequency signal fed to the first terminal 64a is selectively outputted to the second terminal 64b or the third terminal 64c. The second transmission line 65 is connected to the second terminal 64b, and transmits the radio-frequency signal fed from the second terminal 64b. The divider 66 has a fourth terminal 66a, a fifth terminal 66b, and a sixth terminal 66c. In the divider 66, the radio-frequency signal led to the fourth terminal 66a through the second transmission line 65 is outputted to the fifth terminal 66b, and the radio-frequency signal fed to the fifth terminal 66b is outputted to the sixth terminal 66c. The third transmission line 67 is connected to the fifth terminal 66*b*, and transmits the radio-frequency signal outputted from the fifth terminal 66*b*, and also transmits radio-frequency signals to the fifth terminal 65*b*. The transmitting/receiving antenna 62 is connected to the third transmission line 67, and radiates and acquires radio-frequency signals. The fourth transmission line 68 is connected to the third terminal 64*c*, and transmits the radio-frequency signal outputted from the third terminal 64*c*. The fifth transmission line 69 is connected to the sixth terminal 66*c*, and transmits the radio-frequency signal outputted from the sixth terminal 66*c*. The mixer 70 is connected to the fourth and fifth transmission lines 68 and 69, and mixes the radio-frequency signals fed from the fourth transmission line 68 and the fifth transmission line 69, respectively, to output an intermediate-frequency signal. The direct-current blocking circuit 1 is inserted in the first transmission line 63 to allow passage of radio-frequency signals through the waveguide 6. While the transmitter-receiver 61 of this embodiment employs the direct-current blocking circuit 1 shown in FIG. 1, there is no particular limitation and any one of the direct-current blocking circuits of the above-mentioned embodiments may be employed instead.

The first to fifth transmission lines 63, 65, 67, 68, and 69 are similar in structure to the above-mentioned transmission line 44, and are formed on the dielectric substrate 2, for example. Moreover, the direct-current blocking circuit 1 is inserted in the first transmission line 63 in a manner similar to that inserting it in the transmission line 44. Note that the radio-frequency oscillator 43 is similar in structure to the radio-frequency oscillator 43 of the above-mentioned embodiment, and therefore the description thereof will be omitted.

In the branch (switch) 64, the radio-frequency signal fed to the first terminal 64*a* is selectively outputted to the second terminal 64*b* or the third terminal 64*c*. The branch 64 is implemented by using a radio-frequency switch element, for example. In response to the control signal issued from a not-shown control section, the branch 64 effects the connection between the first terminal 64*a* and the second terminal 64*b* or the connection between the first terminal 64*a* and the third terminal 64*c* in a selective manner.

The radar device 60 is implemented by using a pulse radar. Under the control of the above-mentioned control section, the first terminal 64*a* and the second terminal 64*b* are connected to each other to output a pulsed radio-frequency signal from the second terminal 64*b*, and whereafter the first terminal 64*a* and the third terminal 64*c* are connected to each other to output a radio-frequency signal from the third terminal 64*c*. Alternatively, the radar device 60 may be implemented by using FM-CW radar adopting a voltage-controlled oscillator as its oscillator or by using Two-Frequency CW radar, FM pulse radar, Spread Spectrum radar, or the like.

In the divider 66, the radio-frequency signal fed to the fourth terminal 66*a* is outputted to the fifth terminal 66*b*, and the radio-frequency signal fed to the fifth terminal 66*b* is outputted to the sixth terminal 66*c*. The divider 66 is implemented by using a radio-frequency switch element, a hybrid circuit, or a circulator. The hybrid circuit is implemented by using, for example, a directional coupler, a branch line, a Magic T coupler, or a rat race.

The radio-frequency signal produced by the radio-frequency oscillator 43 passes through the first transmission line 63 and the direct-current blocking circuit 1, is fed to the transmitting/receiving antenna 62 through the divider 66 and the third transmission line 67, and is eventually emitted from the transmitting/receiving antenna 62 as a radio wave. Also, the radio-frequency signal produced by the radio-frequency oscillator 43 passes through the first transmission line 63 and is then fed to the mixer 70 as a local signal, through the branch 64 and the fourth transmission line 68.

Upon receipt of an incoming radio wave, the transmitting/receiving antenna 62 outputs a radio-frequency signal based on the radio wave to the third transmission line 67, and the radio-frequency signal is fed to the mixer 70 through the divider 66 and the fifth transmission line 69.

The mixer 70 mixes the radio-frequency signals fed from the fourth transmission line 68 and the fifth transmission line 69, respectively, to output an intermediate-frequency signal. The intermediate-frequency signal outputted from the mixer 70 is fed to the distance detector 71.

The distance detector 71 includes the above-mentioned radio-frequency detector 53. On the basis of the intermediate-frequency signal obtained through the reception of an echo, which is a radio wave emitted from the transmitting/receiving antenna 62 and then reflected from an object to be detected, the distance detector 71 determines the distance to the object to be detected by calculation. The distance detector 71 is implemented by using a microcomputer, for example.

In this way, the radar device 60 is attained that has the transmitter-receiver 61 with the direct-current blocking circuit 1 inserted in the first transmission line 63.

In the transmitter-receiver 61 and the radar device 60 thus far described, the direct-current blocking circuit 1 is inserted in the first transmission line 63. As has already been described, the direct-current blocking circuit 1 is capable of blocking direct current voltage. Accordingly, even if a direct current voltage is applied to a part of the first transmission line 63 which is located toward the branch 64 with respect to the direct-current blocking circuit 1, the direct current voltage is blocked by the direct-current blocking circuit 1 with the consequence that the radio-frequency oscillator 43 is free from direct current transmission. It thus never occurs that undesired voltage is applied to the radio-frequency oscillator 43, wherefore the radio-frequency oscillator 43 can be protected against quality degradation and malfunction. This allows the transmitter-receiver 61 and the radar device 60 capable of producing radio-frequency signals with stable magnitude to be attained.

While, in the present embodiment, the direct-current blocking circuit 1 is inserted in the first transmission line 63, it is essential only that the direct-current blocking circuit 1 be inserted in at least one of the first to fifth transmission lines 63, 65, 67, 68, and 69. Since direct current voltage is blocked by the direct-current blocking circuit 1, it is possible to prevent application of undesired voltage to an electronic component connected to the direct-current blocking circuit 1, and thereby attain the transmitter-receiver 61 and the radar device 60 capable of protecting the electronic component against quality degradation and malfunction.

Further, as another example of the transmitter-receiver and the radar device of the present embodiment, the mixer 70 disposed in the transmitter-receiver 61 and therefore the radar device 60 of the present embodiment may be implemented by using any one of the hybrid circuit devices of the fourth to seventh embodiments, namely the hybrid mixers 80, 100, 110, and 120. In this case, the second connection line 77 is connected to the fourth transmission line 68, and the fourth connection line 79 is connected to the fifth transmission line 69, so that the hybrid mixer 80, 100, 110, 120 can output an intermediate-frequency signal by mixing the radio-frequency signals fed from the fourth transmission line 68 and the fifth transmission line 69, respectively. This makes it possible to prevent application of undesired voltage to the distance detector 71 that is an electronic component which receives an intermediate-frequency signal, and thereby protect the distance detector 71 against quality degradation and malfunction. Accordingly, highly reliable transmitter-receiver and radar device can be attained.

Twelfth Embodiment

Figure 19:
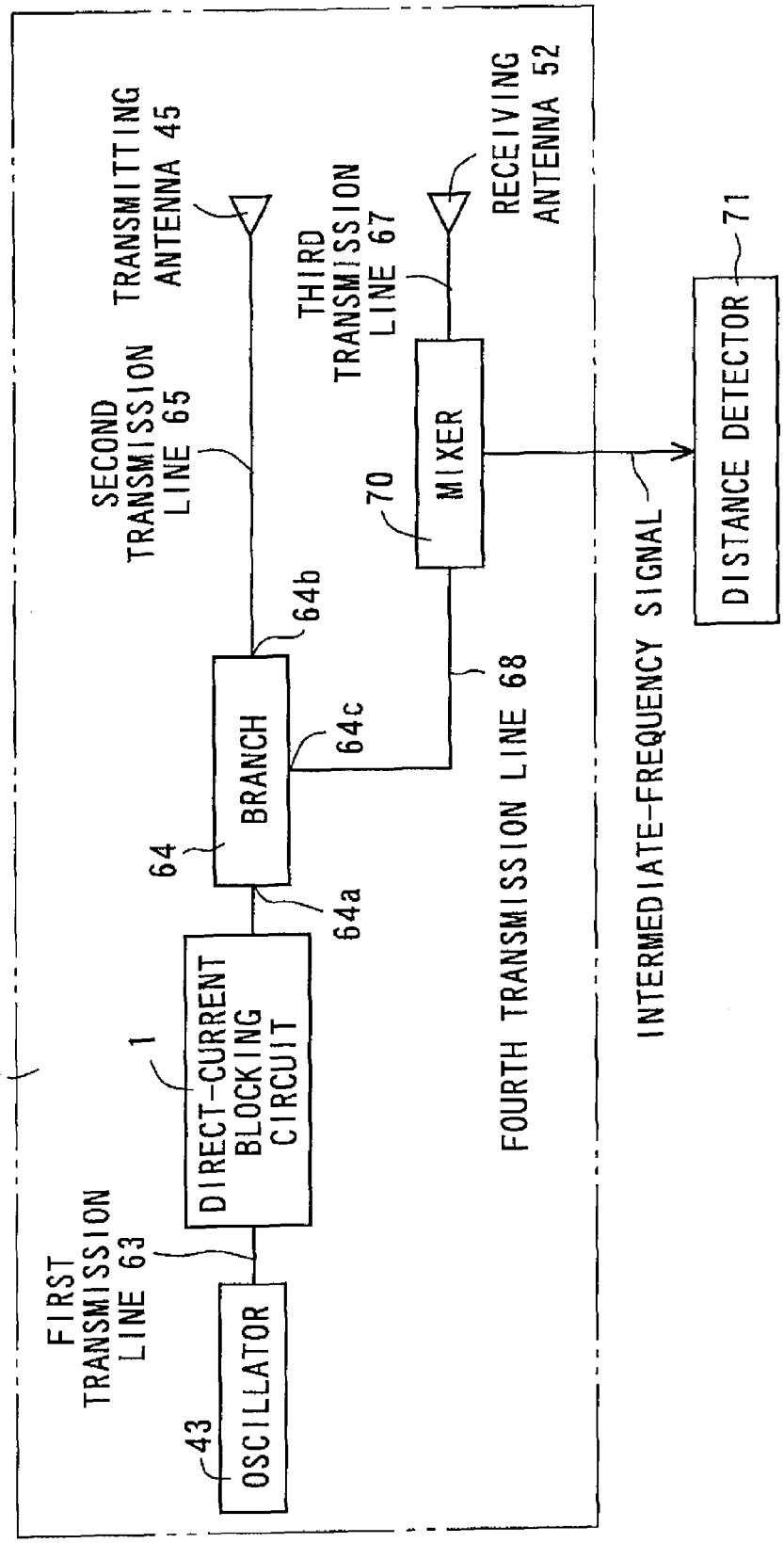
FIG. 19 is a schematic diagram showing the configuration of the radar device of a twelfth embodiment of the invention.

FIG. 19 is a schematic diagram showing the configuration of a radar device 74 of a twelfth embodiment of the invention. The radar device 74 includes a transmitter-receiver 75 and a distance detector 71 for detecting a distance from the transmitter-receiver 75 to an object to be detected on the basis of an intermediate-frequency signal from the transmitter-receiver 75. In the radar device 74 of this embodiment, the components that play the same or corresponding role as in the radar device 60 of the above-mentioned embodiment as shown in FIG. 12 will be denoted by the same reference symbols, and overlapping descriptions may be omitted.

The transmitter-receiver 75 includes a radio-frequency oscillator 43 for generating radio-frequency signals; a first transmission line 63; a branch 64; a second transmission line 65; a transmitting antenna 45; a receiving antenna 52; a third transmission line 67; a fourth transmission line 68; a mixer 70; and the above-mentioned direct-current blocking circuit 1 shown in FIG. 1. The first transmission line 63 is connected to the radio-frequency oscillator 43, and transmits radio-frequency signals. The branch 64 has a first terminal 64a, a second terminal 64b, and a third terminal 64c, of which the first terminal 64a is connected to the first transmission line 63. In the branch 64, the radio-frequency signal fed to the first terminal 64a is selectively outputted to the second terminal 64b or the third terminal 64c. The second transmission line 65 is connected to the second terminal 64b, and transmits the radio-frequency signal fed from the second terminal 64b. The transmitting antenna 45 is connected to the second transmission line 65, and radiates radio-frequency signals. The receiving antenna 52 acquires radio-frequency signals. The third transmission line 67 is connected to the receiving antenna 52, and transmits the radio-frequency signal acquired. The fourth transmission line 68 is connected to the third terminal 64c, and transmits the radio-frequency signal outputted from the third terminal 64c. The mixer 70 is connected to the third and fourth transmission lines 67 and 68, and mixes the radio-frequency signals fed from the third transmission line 67 and the fourth transmission line 68, respectively, to output an intermediate-frequency signal. The direct-current blocking circuit 1 is inserted in the first transmission line 63 to allow passage of radio-frequency signals through the waveguide 6. While the transmitter-receiver 75 of this embodiment employs the direct-current blocking circuit 1 shown in FIG. 1, there is no particular limitation and any one of the direct-current blocking circuits of the above-mentioned embodiments may be employed instead.

The radio-frequency signal produced by the radio-frequency oscillator 43 passes through the first transmission, line 63 and the direct-current blocking circuit 1, is fed to the transmitting antenna 45 through the branch 64 and the second transmission line 65, and is eventually emitted from the transmitting antenna 45 as a radio wave. Also, the radio-frequency signal produced by the radio-frequency oscillator 43 passes through the first, transmission line 63 and is then fed to the mixer 70, as a local signal, through the branch 64 and the fourth transmission line 68.

Upon receipt of an incoming radio wave, the receiving antenna 52 provides a radio-frequency signal based on the radio wave to the third transmission line 67, and the radio-frequency signal is fed to the mixer 70.

The mixer 70 mixes the radio-frequency signals fed from the third transmission line 67 and the fourth transmission line 68, respectively, to output an intermediate-frequency signal. The intermediate-frequency signal outputted from the mixer 70 is fed to the distance detector 71.

In this way, the radar device 74 is attained that has the transmitter-receiver 75 with the direct-current blocking circuit 1 inserted in the first transmission line 63.

In the transmitter-receiver 75 and the radar device 74 thus far described, the direct-current blocking circuit 1 is inserted in the first transmission line 63. As has already been described, the direct-current blocking circuit 1 is capable of blocking direct current voltage. Accordingly, even if a direct current voltage is applied to a part of the first transmission line 63 which is located toward the branch 64 with respect to the direct-current blocking circuit 1, the direct current voltage is blocked by the direct-current blocking circuit 1 with the consequence that the radio-frequency oscillator 43 is free from direct, current transmission. It thus never occurs that undesired voltage is applied to the radio-frequency oscillator 43, wherefore the radio-frequency oscillator 43 can be protected against quality degradation and malfunction. This allows the transmitter-receiver 75 and the radar device 74 capable of producing radio-frequency signals with stable magnitude to be attained.

While, in the present embodiment, the direct-current blocking circuit 1 is inserted in the first transmission line 63, it is essential only that the direct-current blocking circuit 1 be inserted in at least one of the first to fourth transmission lines 63, 65, 67, and 68. Since direct current voltage is blocked by the direct-current blocking circuit 1, it is possible to prevent application of undesired voltage to an electronic component connected to the direct-current blocking circuit 1, and thereby attain the transmitter-receiver 75 and the radar device 74 capable of protecting the electronic component against quality degradation and malfunction.

Further, as another example of the transmitter-receiver and the radar device of the present embodiment, the mixer 70 disposed in the transmitter-receiver 75 and therefore the radar device 74 of the present embodiment may be implemented by using any one of the hybrid circuit devices of the fourth to seventh embodiments, namely the hybrid mixers 80, 100, 110, and 120. In this case, the second connection line 77 is connected to the fourth transmission line 68, and the fourth connection line 79 is connected to the third transmission line 67, so that the hybrid mixer 80, 100, 110, 120 can output an intermediate-frequency signal by mixing the radio-frequency signals fed from the third transmission line 67 and the fourth transmission line 68, respectively. This makes it possible to prevent application of undesired voltage to the distance detector 71 that is an electronic component which receives an intermediate-frequency signal, and thereby protects the distance detector 71 against quality degradation and malfunction. Accordingly, highly reliable transmitter-receiver and radar device can be attained.

Moreover, as another embodiment of the invention, the transmitter 41, the receiver 51, the transmitter-receivers 61 and 75, and the radar devices 60 and 74 of the ninth to twelfth embodiments may be designed to have the phase-shift circuit device 150 of the eighth embodiment in lieu of the direct-current blocking circuit 1. For example, as benefits of the provision of the phase-shift circuit device 150 for the transmitter in particular, phase shifts occurring in the transmission lines due to variation in shape among bonding wires and bumps used for the connection of the radio-frequency oscillator or variation in wiring width among the transmission lines can be adjusted on an individual basis with consequent achievement of matching, stable oscillation characteristics can be obtained, and insertion loss can be minimized. Therefore, a transmitter, as well as a transmitter-receiver which allow high transmission output can be attained. Further, as benefits for the receiver in particular, stable detection characteristics can be obtained and insertion loss can be minimized. Therefore, a receiver, as well as a transmitter-receiver which allow high detection output can be attained. Furthermore, higher reliability can be ensured as to the intermediate-frequency signal produced by the mixer 70. Accordingly, highly reliable transmitter, receiver, transmitter-receiver, and radar device can be attained.

While the invention has been shown in several forms, it is not so limited but is susceptible of various changes and modifications without departing from the gist of the invention. For example, in still another example of the transmitter-receiver and the radar device of the present embodiment, in the transmitter-receivers 61 and 75 and the radar devices 60 and 74, the branch 64 may be implemented by using a hybrid circuit device having the direct-current blocking circuit and the directional coupler described previously, or the divider 66 may be implemented by using a device having the direct-current blocking circuit and the circulator described previously.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all, changes which come within the meaning and the range of equivalency of the claims are therefore intended to be embraced therein.

The invention claimed is:

1. A direct-current blocking circuit comprising:
   a dielectric substrate;
   a conductor layer which is formed between one surface and another surface of the dielectric substrate, and comprises a first portion, a second portion, and a third portion;
   a first planar line which includes the first portion of the conductor layer, and is located on the one surface side of the dielectric substrate with respect to the conductor layer;
   a second planar line which includes the second portion of the conductor layer, and is located on the one surface side of the dielectric substrate with respect to the conductor layer, with its one end at a predetermined distance away from one end of the first planar line; and
   a waveguide which includes the third portion of the conductor layer, and is located on the other surface side of the dielectric substrate with respect to the conductor layer in such a manner that, in a direction in which an electric signal is transmitted, its one end overlaps with one end of the first planar line and its another end overlaps with one end of the second planar line,
   in the conductor layer, in a region where the waveguide and the first planar line overlap, the waveguide and the first planar line being electromagnetically coupled to each other, and also in a region where the waveguide and the second planar line overlap, the waveguide and the second planar line being electromagnetically coupled to each other.

2. The direct-current blocking circuit of claim 1, wherein the first and second planar lines are arranged so that one end of the first planar line and one end of the second planar line are parallel to each other and are formed to be apart from each other in a width direction which is perpendicular to an extending direction thereof and a direction of thickness of the dielectric substrate, and extend in opposite directions in a face-to-face manner,
   wherein the waveguide and the first planar line are electromagnetically coupled to each other in the conductor layer at a location closer to another end of the first planar line than a region where the first and second planar lines face each other in the extending direction thereof,
   and wherein the waveguide and the second planar line are electromagnetically coupled to each other in the conductor layer at a location closer to another end of the second planar line than the region where the first and second planar lines face each other in the extending direction thereof.

3. The direct-current blocking circuit of claim 1, wherein the predetermined distance is selected to be greater than or equal to 30 μm,
   and wherein the waveguide comprises:
   a bottom conductor layer disposed in parallel with the conductor layer;
   a plurality of side-wall conductor columns, which are electrically conductive, formed so as to extend between the conductor layer and the bottom conductor layer and arranged in two rows along an electric-signal transmission direction so that a distance therebetween in the transmission direction is shorter than or equal to a cutoff wavelength; and
   a plurality of shielding conductor columns that are located at each of one end and the other end of the waveguide in the electric-signal transmission direction, are electrically conductive, are formed so as to extend between the conductor layer and the bottom conductor layer, and are arranged to be apart from each other in the width direction which is perpendicular to the transmission direct on and the direction of thickness of the dielectric substrate by a distance shorter than or equal to the cutoff wavelength.

4. The direct-current blocking circuit of claim 3, wherein the length of the waveguide in the transmission direction is selected to be greater than or equal to one of in-wave guide wavelengths.

5. The direct-current blocking circuit of claim 4, wherein, in the conductor layer, a thicknesswisely-penetrate first through-hole is formed in the region where the waveguide and the first planar line overlap so that the waveguide and the first planar line can be electromagnetically coupled to each other, and a thicknesswisely-penetrated second through-hole is formed in the region where the waveguide and the second planar line overlap so that the waveguide and the second planar line can be electromagnetically coupled to each other,
   and wherein a length between the first through-hole and the one end of the waveguide in the transmission direction and a length between the second through-hole and the other end of the waveguide in the transmission direction are each selected to be greater than zero but less than half of the in-waveguide wavelengths.

6. A hybrid circuit device comprising:
   a power divider having a plurality of terminals for dividing electric power supplied from a predetermined one of the terminals and causing the power to be outputted from a different terminal than the predetermined terminal; and
   the direct-current blocking circuit of claim 1,
   wherein the power divider is formed on one surface of the dielectric substrate, and the first or second planar line of the direct-current blocking circuit are connected to one terminal, of a plurality of the terminals of the power divider, that receives electric power input.

7. The hybrid circuit device of claim 6, wherein the power divider is constructed of a rat race having a ring-shaped transmission line and first to fourth terminals arranged circumferentially of the ring-shaped transmission line in the order named, in which the perimeter of the ring-shaped transmission line is set at $3(2n-1)\lambda/2$, where $\lambda$ represents the wavelength of an electromagnetic wave to be inputted and n represents a natural number, each of a line length between the first and second terminals, a line length between the second and third terminals, and a line length between the third and fourth terminals is selected to be $(2n-1)\lambda/4$, and a line length between the fourth terminal and the first terminal is selected to be $3(2n-1)\lambda/4$, the hybrid circuit device further comprising:
a first extension extending from the second terminal;
a second extension extending from the fourth terminal;
a first detector extension connected to an end of the first extension opposite from the end thereof connected to the second terminal, for detecting in accordance with an applied voltage;
a second detector element connected to an end of the second extension opposite from the end thereof connected to the fourth terminal, for detecting in accordance with an applied voltage; and
an output line connected to the rat race, for outputting electromagnetic waves of intermediate frequency outputted from the first and second detector elements,
and wherein the direct-current blocking circuit is connected to at least one of the first terminal and the third terminal on an individual basis.

8. The hybrid circuit device of claim 7, wherein, each of the first and second extensions includes a matching circuit.

9. The hybrid circuit device of claim 7, wherein the first extension and the second extension are made equal in electrical length.

10. The hybrid circuit device of claim 7, further comprising:
a first bias supply line for applying voltage to the first detector element; and
a second bias supply line for applying voltage to the second detector element,
wherein at least one of the first and second bias supply lines is formed in the dielectric substrate so as to cross a region between the first and second planar lines.

11. A transmitter comprising:
an oscillator for generating radio-frequency signals;
a transmission line connected to the oscillator, for transmitting the radio-frequency signal from the oscillator;
the direct-current blocking circuit of claim 1, that is inserted in the transmission line to allow passage of the radio-frequency signal through the waveguide; and
an antenna connected to the transmission line, for radiating the radio-frequency signal.

12. A receiver comprising:
an antenna for acquiring radio-frequency signals;
a transmission line connected to the antenna, for transmitting the radio-frequency signal acquired by the antenna;
the direct-current blocking circuit of claim 1, that is inserted in the transmission line to allow passage of the radio-frequency signal through the waveguide; and
a detector connected to the transmission line for detecting the radio-frequency signal transmitted to the transmission line.

13. A transmitter-receiver comprising:
an oscillator for generating radio-frequency signals;
a first transmission line connected to the oscillator, for transmitting radio-frequency signals;
a branch having a first terminal, a second terminal, and a third terminal, of which the first terminal is connected to the first transmission line, and in which a radio-frequency signal fed to the first terminal is selectively outputted to the second terminal or the third terminal;
a second transmission line connected to the second terminal, for transmitting a radio-frequency signal fed from the second terminals;
a divider having a fourth terminal, a fifth terminal, and a sixth terminal, in which a radio-frequency signal fed to the fourth terminal through the second transmission line is outputted to the fifth terminal, and a radio-frequency signal fed to the fifth terminal is outputted to the sixth terminal;
a third transmission line connected to the fifth terminal, for transmitting a radio-frequency signal outputted from the fifth terminal and also transmitting a radio-frequency signals to the fifth terminal;
an antenna connected to the third transmission line, for radiating and acquiring radio-frequency signals;
a fourth transmission line connected to the third terminal, for transmitting a radio-frequency signal outputted from the third terminal;
a fifth transmission line connected to the sixth terminal, for transmitting a radio-frequency signal outputted from the sixth terminal;
a mixer connected to the fourth and fifth transmission lines, for mixing radio-frequency signals fed from the fourth transmission line and the fifth transmission line, respectively, to output an intermediate-frequency signal; and
the direct-current blocking circuit of claim 1, that is inserted in at least one of the first to fifth transmission lines to allow passage of a radio-frequency signal through the waveguide.

14. A transmitter-receiver comprising:
an oscillator for generating radio-frequency signals;
a first transmission line connected to the oscillator, for transmitting radio-frequency signals;
a branch having a first terminal, a second terminal, and a third terminal, of which the first terminal is connected to the first transmission line, and in which a radio-frequency signal fed to the first terminal is selectively outputted to the second terminal or the third terminal;
a second transmission line connected to the second terminal, for transmitting a radio-frequency signal fed from the second terminal;
a divider having a fourth terminal, a fifth terminal, and a sixth terminal, in which a radio-frequency signal fed to the fourth terminal through the second transmission line is outputted to the fifth terminal, and a radio-frequency signal fed to the fifth terminal is outputted to the sixth terminal;
a third transmission line connected to the fifth terminal, for transmitting a radio-frequency signal outputted from the fifth terminal and also transmitting a radio-frequency signal to the fifth terminal;
an antenna connected to the third transmission line, for radiating and acquiring radio-frequency signals;
a fourth transmission line connected to the third terminal, for transmitting a radio-frequency signal outputted from the third terminal;

a fifth transmission line connected to the sixth terminal, for transmitting a radio-frequency signal outputted from the sixth terminal; and the hybrid circuit device of claim 6, connected to the fourth and fifth transmission lines, for mixing radio-frequency signals fed from the fourth transmission line and the fifth transmission line, respectively, to output an intermediate-frequency signal.

15. A transmitter-receiver comprising:

an oscillator for generating radio-frequency signals;

a first transmission line connected to the oscillator, for transmitting radio-frequency signals;

a branch having a first terminal, a second terminal, and a third terminal, of which the first terminal is connected to the first transmission line, and in which a radio-frequency signal fed to the first terminal is selectively outputted to the second terminal or the third terminal;

a second transmission line connected to the second terminal, for transmitting a radio-frequency signal fed from the second terminal;

a transmitting antenna connected to the second transmission line, for radiating radio-frequency signals;

a receiving antenna for acquiring radio-frequency signals;

a third transmission line connected to the receiving antenna, for transmitting a radio-frequency signal acquired;

a fourth transmission line connected to the third terminal, for transmitting a radio-frequency signal outputted from the third terminal, a mixer connected to the third and fourth transmission lines, for mixing radio-frequency signals fed from the third transmission line and the fourth transmission line, respectively, to output an intermediate-frequency signal; and the direct-current blocking circuit of claim 1, that is inserted in at least one of the first to fourth transmission lines to allow passage of a radio-frequency signal through the waveguide.

16. A transmitter-receiver comprising:

an oscillator for generating radio-frequency signals;

a first transmission line connected to the oscillator, for transmitting radio-frequency signals;

a branch having a first terminal, a second terminal, and a third terminal, of which the first terminal is connected to the first transmission line, and in which a radio-frequency signal fed to the first terminal is selectively outputted to the second terminal or the third terminal;

a second transmission line connected to the second terminal, for transmitting radio-frequency signal fed from the second terminal;

a transmitting antenna connected to the second transmission line, for radiating radio-frequency signals;

a receiving antenna for acquiring radio-frequency signals;

a third transmission line connected to the receiving antenna, for transmitting a radio-frequency signal acquired;

a fourth transmission line connected to the third terminal, for transmitting a radio-frequency signal outputted from the third terminal; and the hybrid circuit device of claim 6, connected to a third and fourth transmission lines, for mixing radio-frequency signals fed from the third transmission line and the fourth transmission line, respectively, to output an intermediate-frequency signal.

17. A radar device comprising:

the transmitter-receiver of claim 13; and a distance detector for detecting a distance from the transmitter-receiver to an object to be detected on the basis of the intermediate-frequency signal from the transmitter-receiver.

* * * * *